(12) United States Patent
Boshernitsan et al.

(10) Patent No.: US 9,032,376 B2
(45) Date of Patent: May 12, 2015

(54) STATIC ANALYSIS OF COMPUTER CODE TO DETERMINE IMPACT OF CHANGE TO A CODE COMPONENT UPON A DEPENDENT CODE COMPONENT

(71) Applicant: Synopsys, Inc., Mountain View, CA (US)

(72) Inventors: Marat Boshernitsan, San Francisco, CA (US); Andreas Kuehlmann, Berkeley, CA (US); Scott McPeak, San Francisco, CA (US); Philip Chong, Berkeley, CA (US); Tobias Welp, Berkeley, CA (US)

(73) Assignee: Synopsys, Inc., Mountain View, CA (US)

( * ) Notice: Subject to any disclaimer, the term of this patent is extended or adjusted under 35 U.S.C. 154(b) by 8 days.

(21) Appl. No.: 14/037,576

(22) Filed: Sep. 26, 2013

(65) Prior Publication Data

US 2014/0130020 A1    May 8, 2014

Related U.S. Application Data

(60) Provisional application No. 61/706,819, filed on Sep. 28, 2012, provisional application No. 61/840,501, filed on Jun. 28, 2013.

(51) Int. Cl.
  *G06F 9/44* (2006.01)
  *G06F 11/00* (2006.01)
  *G06F 11/36* (2006.01)

(52) U.S. Cl.
  CPC .......... *G06F 11/3688* (2013.01); *G06F 11/368* (2013.01)

(58) Field of Classification Search
  CPC  G06F 11/368; G06F 11/3688; G06F 11/3692
  USPC ........................... 717/124–135; 714/37, 38.1
  See application file for complete search history.

(56) References Cited

U.S. PATENT DOCUMENTS

| 5,335,344 A | 8/1994 | Hastings |
| 5,703,788 A | 12/1997 | Shei et al. |

(Continued)

FOREIGN PATENT DOCUMENTS

| WO | WO-2014052655 A2 | 4/2014 |
| WO | WO-2014052655 A3 | 4/2014 |

OTHER PUBLICATIONS

"International Application Serial No. PCT/US2013/062016, International Search Report mailed Apr. 9, 2014", 2 pgs.

(Continued)

*Primary Examiner* — Qing Chen
(74) *Attorney, Agent, or Firm* — Schwegman Lundberg & Woessner, P.A.

(57) ABSTRACT

A method is provided to evaluate impact of a change in code of a depended upon component of a system stored in a computer readable storage device, upon a dependent component of the system, the method comprising: identifying a dependency relationship between a first component stored in a computer readable storage device and a second component stored in the computer readable storage device; in response to a determination that the second component depends upon the first component, configuring a computer system to obtain a first property evaluation corresponding to the first component; and in response to obtaining the first property evaluation corresponding to the first component, configuring the computer system to associate the first property evaluation with the second component, and obtain a second property evaluation corresponding to the second component, wherein the second component is associated with the first property evaluation.

32 Claims, 16 Drawing Sheets

(56) References Cited

U.S. PATENT DOCUMENTS

| | | | |
|---|---|---|---|
| 7,340,726 | B1 | 3/2008 | Chelf et al. |
| 8,359,583 | B2 | 1/2013 | Chou et al. |
| 8,516,434 | B2 | 8/2013 | McPeak |
| 8,516,443 | B2* | 8/2013 | Li et al. .................. 717/123 |
| 8,549,490 | B2* | 10/2013 | Dolby et al. .................. 717/133 |
| 8,762,949 | B2* | 6/2014 | Conway et al. .................. 717/126 |
| 8,806,450 | B1* | 8/2014 | Maharana et al. .................. 717/133 |
| 2003/0066061 | A1 | 4/2003 | Wu et al. |
| 2007/0006151 | A1* | 1/2007 | Conway et al. .................. 717/120 |
| 2011/0078667 | A1* | 3/2011 | Dolby et al. .................. 717/133 |
| 2012/0151278 | A1 | 6/2012 | Tsantilis |
| 2012/0222021 | A1 | 8/2012 | Zhao |
| 2012/0304153 | A1* | 11/2012 | Li et al. .................. 717/123 |
| 2013/0031531 | A1* | 1/2013 | Keynes et al. .................. 717/126 |
| 2014/0096113 | A1 | 4/2014 | Kuehlmann et al. |

OTHER PUBLICATIONS

"International Application Serial No. PCT/US2013/062016, Written Opinion mailed Apr. 9, 2014", 13 pgs.

Anderson, Paul, "Domain-specific property checking with advanced static analysis", http://mil-embedded.com/articles/domain-specific-checking-advanced-static-analysis/, (Feb. 17, 2011), 5 pgs.

Bessey, Al, et al., "A few Billion Lines of code Later using static Analysis to find Bugs in the Real World", Communications of the ACM | Feb. 2010 | vol. 53 | No. 2, (2010), 66-75.

Chess, Brian, "Secure Programming with Static Analysis", (May 24, 2007), 56 pgs.

Engler, Dawson, et al., "Static Analysis versus Software Model Checking for bug finding", (2004), 12 pgs.

Gomes, Ivo, et al., "An overview on the Static Code Analysis approach in Software Development", 1 Software Testing and Quality, Master in Informatics and Computing Engineering, 2 Software Testing and Quality, Doctoral Program in Informatics Engineering, Faculdade de Engenharia da Universidade do Porto, Rua Dr. Roberto Frias 4200-465, Porto, Portug, (2009), 16 pgs.

Guo, Philip J., et al., "Linux Kernel Developer Responses to Static Analysis Bug Reports", (2009), 8 pgs.

Nori, Aditya V., et al., "The Yogi Project: Software Property Checking via Static Analysis and Testing", (2009), 178-181.

\* cited by examiner

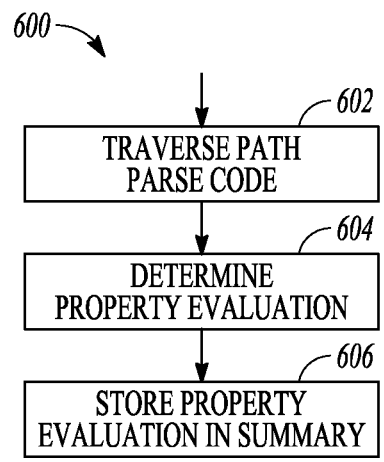
FIG. 6B1
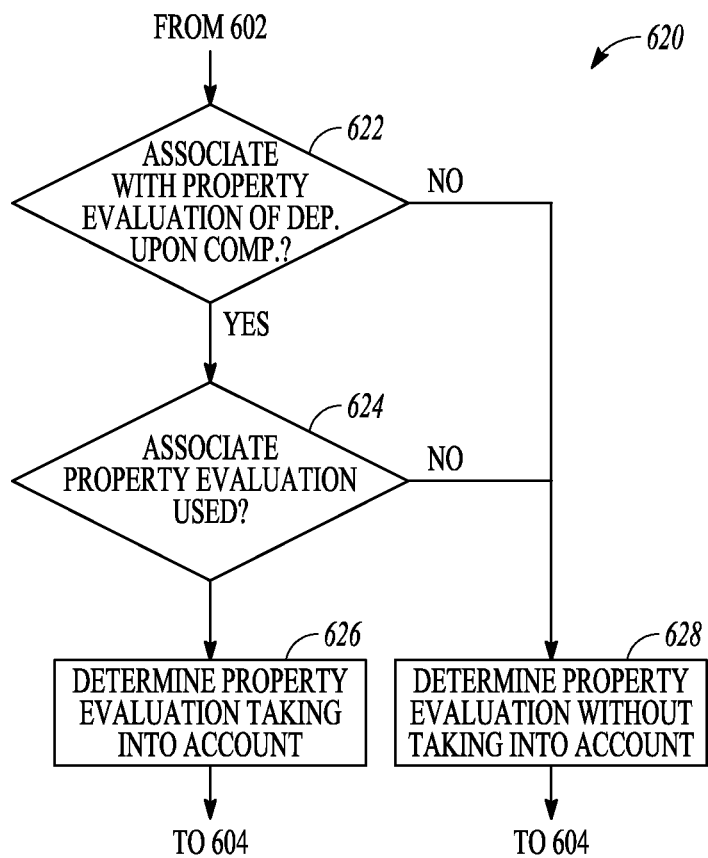
FIG. 6B2

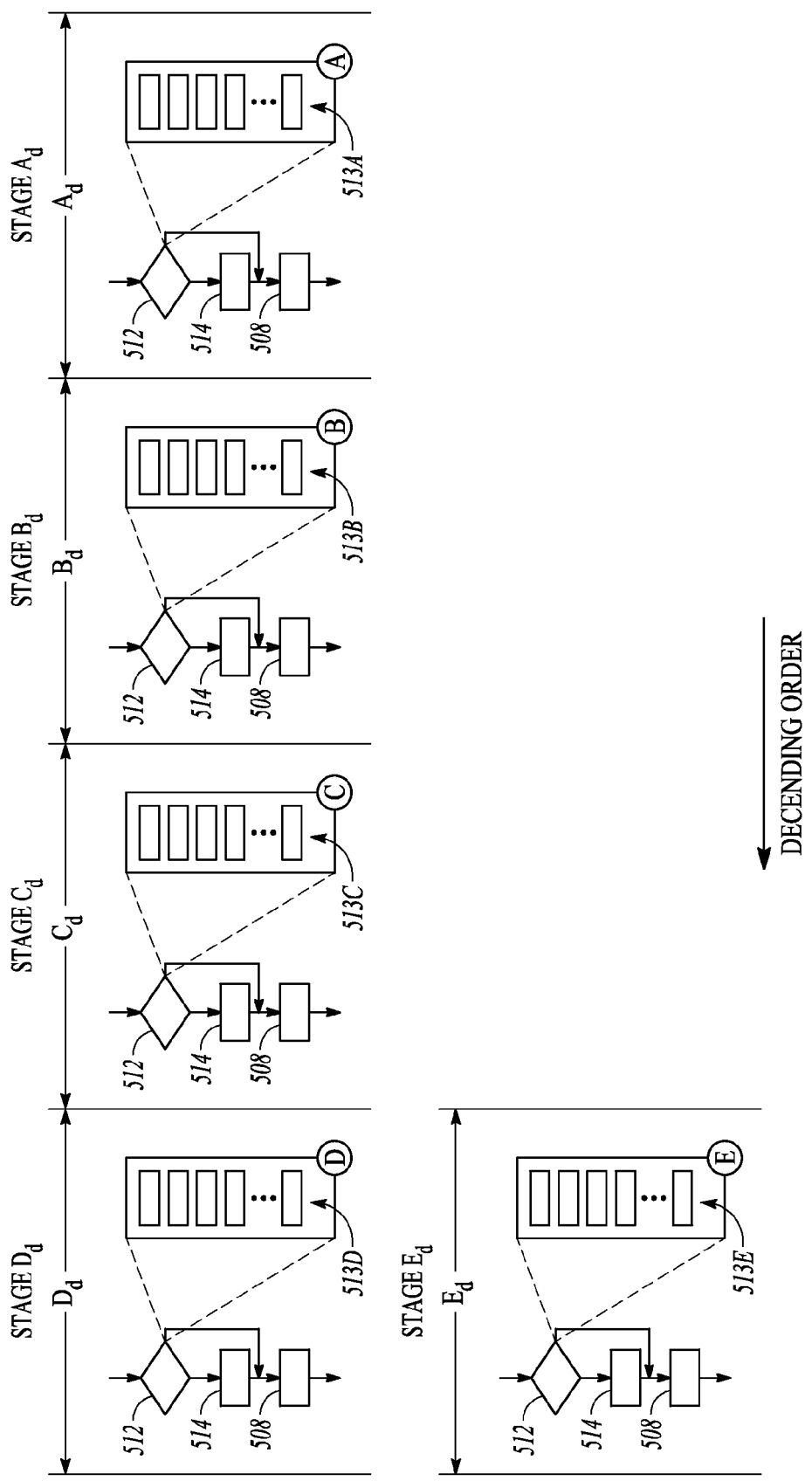
FIG. 6C1

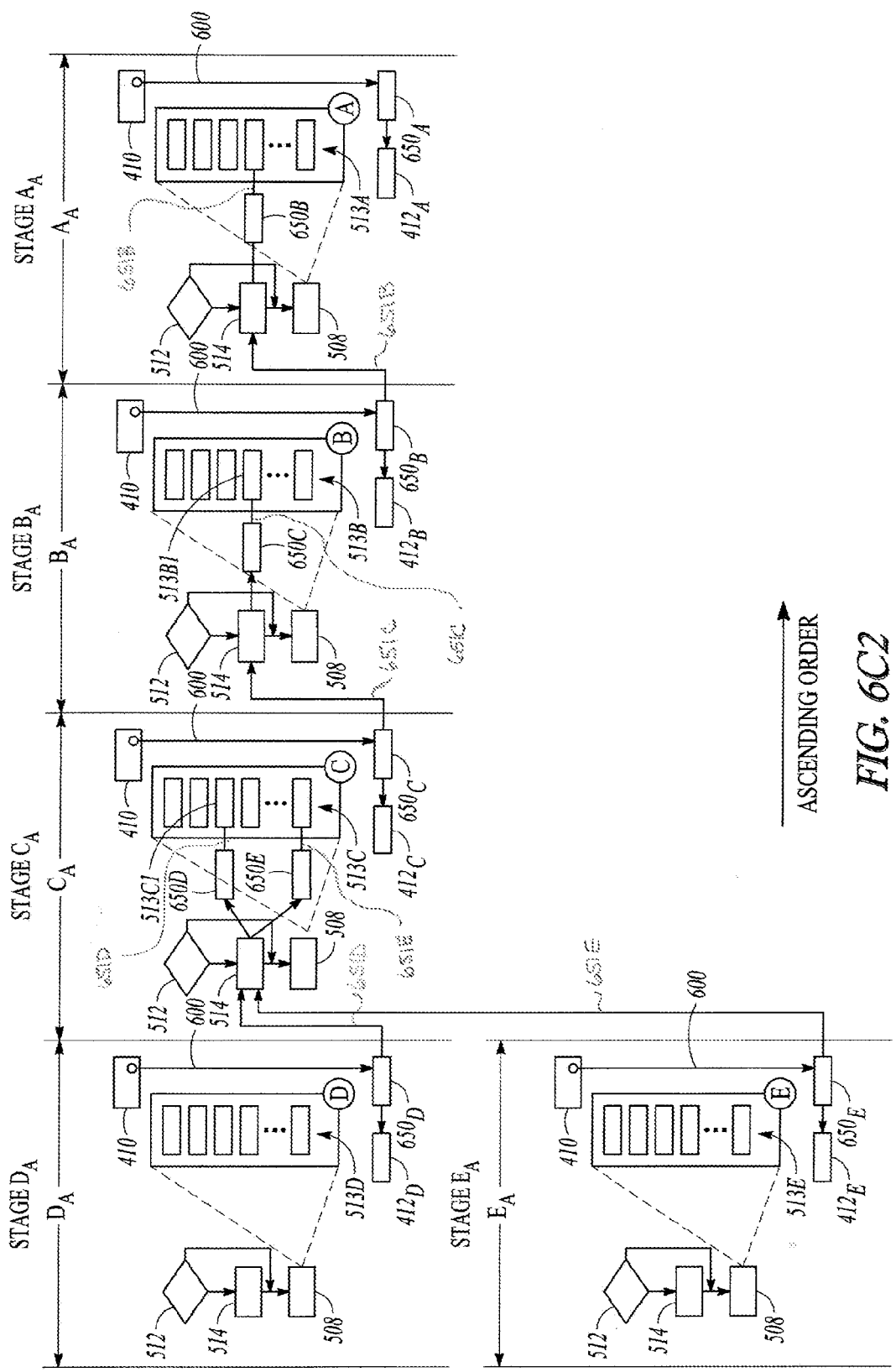
FIG. 6C2

```
class                           ← 802
Foo
{
  void
  function1 ( )
  {
    Bar bar;
    bar->function2 ( ) ;
  }
} ;

class
Bar
{
  Bla *
  function2 (int blaNumber)
  {
    Bla * result (NULL)

result = new Bla (blaNumber) ;
    return result ;
  }
} ;

class
Bla
{
  int
  member_;

Bla (int member)
    : member_(member)
  {
  }
} ;
          BASE VERSION
```

FIG. 9A

```
class                           ← 804
Foo
{
  void
  function1 ( )
  {
    Bar bar;
    bar->function2 ( ) ;
  }
} ;

class
Bar
{
  Bla *
  function2 (int blaNumber)
  {
    Bla * result (NULL)      ← 810
    if (blaNumber = 0)
    {
      cout << "Error:_Number_zero !"
           << endl ;
    }
    result = new Bla (blaNumber) ;
    return result ;
  }
} ;

class
Bla
{
  int
  member_;

Bla (int member)
    : member_(member)
  {
  }
} ;
           REVISION 1
```

FIG. 9B

```
class                    ← 806
Foo
{
  void
  function1 ( )
  {
    Bar bar;
    bar->function2 ( ) ;
  }
} ;

class
Bar
{
  Bla *
  function2 (int blaNumber)
  {
    Bla * result (NULL)         ← 810
    if (blaNumber = 0)
    {
      cout << "Error: -Number-zero !"
        << endl ;
      result = new Bla (blaNumber) ;    ← 812
    }
    return result ;
  }
} ;

class
Bla
{        ← 814
  int
  member_;

Bla (int member)
    : member_(member)
  {
  }
} ;
```

REVISION 2

FIG. 9C

```
class                    ← 808
Foo
{
  void
  function1 ( )
  {
    Bar bar;
    bar->function2 ( ) ;
  }
} ;

class
Bar
{
  Bla *
  function2 (int blaNumber)
  {
    Bla * result (NULL)
    if (blaNumber = 0)
    {
      cout << "Error: -Number-zero !"
        << endl ;
      result - new Bla (blaNumber) ;
    }
    return result ;
  }
} ;

class
Bla
{        ← 816
  long
  member_;

Bla (int member)
    : member_(member)
  {
  }
} ;
```

REVISION 3

FIG. 9D

```
class                              ╭─ 102
Foo
{
  Bla*
  function1 ( )
  {
    Bar bar;
    return bar->function2 ( ) ;
  }
};

class
Bar
{
  Bla *
  function2 (int blaNumber)
  {
    Bla * result (NULL) ;       ╭─ 810
   ┌─────────────────────────┐
   │ if (blaNumber = 0)      │
   │ {                       │
   │   cout << "Error: -Number-zero !"
   │        << endl ;        │
   │ }                       │
   └─────────────────────────┘
    result = new Bla (blaNumber) ;
    return result ;
  }
};

class
Bla
{
  int
  member_;

Bla (int member)
    : member_(member)
  {
  }
};
```

*FIG. 13A*

```
class                              ╭─ 1204
Foo
{
  Bla*
  function1 ( )
  {
    Bar bar;
    return bar->function2 ( ) ;
  }
};

class
Bar
{
  Bla *
  function2 (int blaNumber)
  {
    Bla * result (NULL) ;       ╭─ 810
   ┌─────────────────────────┐
   │ if (blaNumber = 0)      │
   │ {                       │
   │   cout << "Error: -Number-zero !"
   │        << endl ;        │
   │  ┌──────────────────────────┐
   │  │ result = new Bla (blaNumber) ;│─ 812
   │  └──────────────────────────┘
   │ }                       │
   └─────────────────────────┘
    return result ;
  }
};

class
Bla
{                              ╭─ 814
 ┌──────────────┐
 │ int          │
 │ member_;     │
 └──────────────┘
  Bla (int member)
    : member_(member)
  {
  }
};
```

*FIG. 13B*

STATIC ANALYSIS OF COMPUTER CODE TO DETERMINE IMPACT OF CHANGE TO A CODE COMPONENT UPON A DEPENDENT CODE COMPONENT

RELATED APPLICATIONS

This application claims the benefit of priority to U.S. Provisional Patent Application Ser. No. 61/706,819, filed Sep. 28, 2012 and U.S. Provisional Patent Application Ser. No. 61/840,501, filed Jun. 28, 2013, which are hereby incorporated by reference herein in their entirety.

BACKGROUND

Static code analysis is analysis of computer software that is performed using an automated software tool without actual execution of the programs built from the software. Some example uses of static analysis are to identify generic errors (such as memory corruption and data races) and system-specific or interface-specific violations (such as violations of function-ordering constraints). Static analysis also may be employed to identify security vulnerabilities, for example.

Static analysis can be used to detect kinds of errors that are often missed when using dynamic analysis techniques that involve actual execution of the program code. For example, static analysis may detect an illegal operation that is contained in a rarely traversed or otherwise hard-to-test conditional branch code path that is rarely visited during operation of the software, and that therefore, easily could go undetected during dynamic analysis. Static analysis ordinarily involves use of a variety of different checkers to evaluate code paths to identify different kinds of vulnerabilities and/or errors. For example, checkers can be used to detect syntax errors, functions without return values, variables that have been declared but not used, inadvisable automatic type conversions, tainted data, integer overflows, global-variable inconsistencies, problems associated with using modules (e.g., missing or invalid modules or input/export mismatches), to name just a few.

Static analysis techniques have been developed that utilize information generated during a build process to identify the code that is to be subjected to analysis. Modern software typically is developed using a modular approach. Teams of programmers may work on different modules or portions of the software. Consequently, source code, compilers, and ancillary software components often are distributed across many different directories and systems. As a result of this complexity, software developers typically use build management utilities such as the "make" program to assist in the process of building executable code. During a typical software development process, source code either represents an executable script in a high-level programming language, or is compiled to produce byte code that needs to be further interpreted by an interpreter program and/or executable binary code that runs directly on the CPU. Different portions of the software may be written using different programming languages that require the use of different compilers, for example. Moreover, different compilers may be used to compile different portions of the source code, even when all of the code is written in the same language. For example, different compilers may produce executable code that runs on computer systems with different microprocessors. A 'build' process, which involves identifying the source code files associated with a program and establishing appropriate directory locations, compiler names, and other compilation settings involves many steps, and software developers typically automate such a build process using what typically is referred to as a build program. Static analysis processes may leverage information about source code that is made available during the build process by intercepting information that identifies the code to be statically analyzed. Commonly owned U.S. Pat. No. 7,340,726 invented by Chelf et al. describes examples of some known static analysis techniques that leverage information about code made available during a build process.

A computer code based system may comprise multiple code components that have dependency relationships among them. The code components (hereinafter 'components') of a computer code based system are stored in a non-transitory computer readable storage device and are used together to configure a general purpose computer system to perform specific functions. During development of such a computer code based system, individual components may be changed, and changes in these individual components may have an impact upon other components that are dependent upon the changed components even though the other components themselves are unchanged.

FIG. 1 is an illustrative diagram showing relationships among code components of an example computer code based system. In this example, the code of certain components has been changed, but the code of other components is unchanged. The changes to the code components have an impact upon other components even though the impacted code components have not themselves been changed. The impacted components in the example are dependent upon the changed components. Change impact can "ripple" through the computer code based system from the changed components to unchanged components that depend upon the changed components. Not all components that are dependent upon the changed components are impacted by the changes. Moreover, legacy components in the example that are not dependent upon the changed components are not impacted by the changes.

It is possible to use static analysis to analyze the impact that changes to the code of some components have upon unchanged components that have a dependent relationship with changed components.

SUMMARY

In one aspect, a method is provided to evaluate impact of a change in code of a depended upon code component of a system stored in a non-transitory computer readable storage device upon a dependent code component of the system. A first property evaluation summary structure is provided in a computer readable storage device that associates multiple respective property evaluations with a first version of a first component of the system. A second property evaluation summary structure is provided in a computer readable storage device that associates multiple respective property evaluations with a second version of the first component of the system. Corresponding property evaluations from within the first and second property summary evaluation structures are compared to determine whether a change to one of the two versions has had an impact on the other.

In another aspect, a method is provided to evaluate impact of a change in code of a depended upon component of a system stored in a non-transitory computer readable storage device, upon a dependent component of the system. A dependency relationship is identified between a first component stored the storage device and a second component stored in the storage device. In response to a determination that the second component depends upon the first component, the computer system is configured to obtain a first property evaluation corresponding to the first component. In response obtaining the first property evaluation corresponding to the first component, the computer system is configured to associate the first property evaluation with the second component and to determine a second property evaluation corresponding to the second component, the second component being associated with the first property evaluation.

In still another aspect, a method is provided to evaluate impact of a change in code of a depended upon component of a system stored in a non-transitory computer readable storage device, upon a dependent component of the system. A computer system is configured to determine, successively in a component dependency order, respective property evaluations for each of multiple components and to associate respective successive determined property evaluations in a non-transitory computer readable storage device with respective code that is part of a respective next successive component in the component dependency order that depends upon the respective component for which the respective associated property evaluation is determined. At least one of the multiple respective successive acts of determining includes determining a respective property evaluation for a respective component having respective code that is associated with a property evaluation determined for a respective previous successive component in the component dependency order.

BRIEF DESCRIPTION OF THE DRAWINGS

FIG. 6B1 is an illustrative flow diagram representing in general terms an example property evaluation deriver process in accordance with some embodiments.

FIG. 6B2 is an illustrative flow diagram representing additional details of the process of FIG. 6B1 in accordance with some embodiments.

FIGS. 6C1-6C2 are illustrative flow diagrams that represent a process to obtain a property evaluation that involves following a descending code path (FIG. 6C1) and an ascending code path (FIG. 6C2) to obtain a property evaluation for a component in accordance with some embodiments.

FIGS. 9A-9D shows an illustrative base version (FIG. 9A) an illustrative first revision (FIG. 9B), an illustrative second revision (FIG. 9C), and an illustrative third revision (FIG. 91)) of first example code.

FIGS. 13A-13B shows an illustrative base version (FIG. 13A) an illustrative revision (FIG. 13B) of second example code.

DESCRIPTION OF EMBODIMENTS

Figure 1:
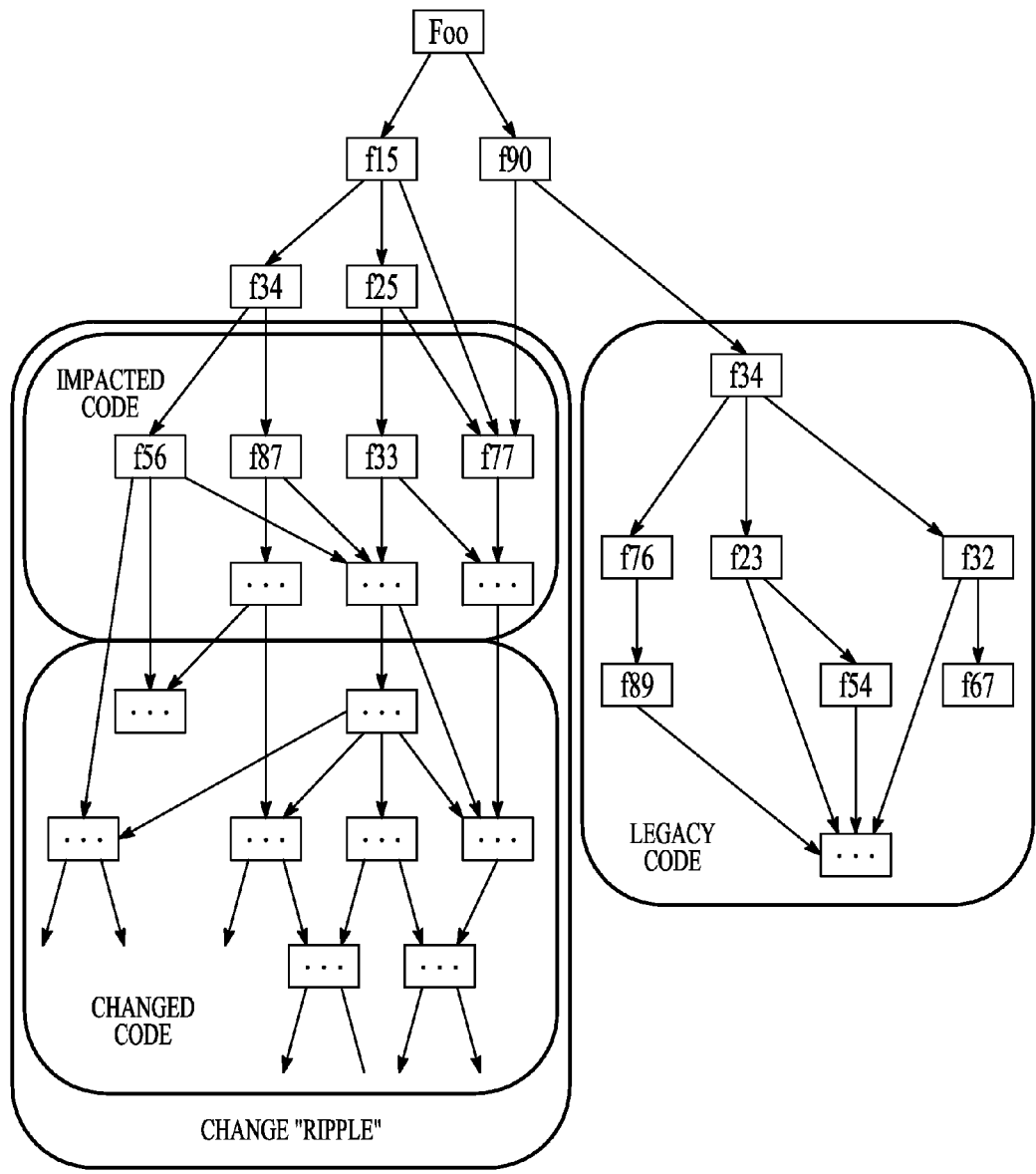
FIG. 1 is an illustrative diagram showing relationships among code module components of an example hypothetical system that includes multiple code modules stored in a non-transitory storage device.

The following description is presented to enable any person skilled in the art to create and use a computer system configuration and related method and article of manufacture to evaluate the impact of a change in a component of a system upon another component of the system that is dependent upon the changed component. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodi- Definitions of Terms Checker As used herein, a 'checker' refers to a computer program that configures a computer system to traverse a program code path while keeping track of code-path-specific information and that provides an indication of errors, violations, vulnerabilities or other information gathered in the course of the code path traversal. Static analysis ordinarily involves running a multiplicity of checkers to check for a wide variety of different errors, violations or vulnerabilities, for example. Executing a checker may involve analyzing one or more computer programs or portions of a program, and then creating an output to a database stored in a computer readable device.

Component

As used herein, the term 'component' refers to a computer code component that is stored in a non-transitory storage device of a system that other units of the system, such as other components, depend upon for their functionality. Examples of computer components include software-based functions, software-based modules, a collection of functions in a class (e.g., methods), a global variable or a data type definition each of which is encoded in a non-transitory computer readable storage device. In some embodiments, a component may represent a hardware block or cell or circuitry of a hardware system, described in a hardware description language, for example. A component can be used through one or more of a function call, reference, instantiation or inheritance, for example. In some embodiments, for example, computer program code defines components that are callable, such as 'functions' or that can otherwise influence the behavior of other units such as 'data type definitions' and 'global variables'. Components may be re-used throughout a computer program through function calls and/or definition dependency.

Property Evaluation

As used herein, a 'property evaluation' of a component refers to an attribute of the component that summarizes some aspect of that component's behavior.

Property Deriver

As used herein, a 'property deriver' refers to a checker that configures a computer system to derive a property evaluation of a component.

Function

The term 'function', also referred to as a subroutine, procedure or method, as used herein with reference to a portion a computer program code refers to a portion of computer program code that performs a specific task that is relatively independent of other code within the program and that typically is written so that it can be invoked at several different places within a program including from within other functions. A call to a function passes control to the function, and after the function is executed, control returns to a next instruction of the caller function.

Type

The term 'type' as used herein with reference to a portion a computer program code refers to a classification identifying one of various types of data, such as real-valued, integer, long or Boolean that determines the possible data values for that type. The term 'global variable' as used herein means a variable that is accessible from many components of a program.

System

As used herein, a 'system' refers to a set of interacting or interdependent components forming an integrated whole.

Dependencies Among Components

Figure 2:
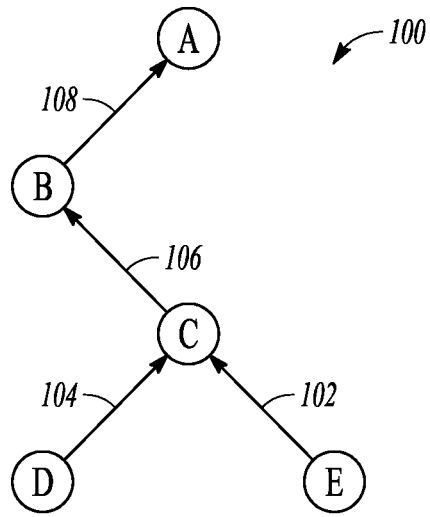
FIG. 2 is an illustrative diagram showing dependency relationships among components of a system in accordance with some embodiments.

FIG. 2 is an illustrative diagram showing dependency relationships 100 among components of a system 100 in accordance with some embodiments. Arc 102 between component E and component C indicates that component C is dependent upon component E. Arc 104 between component D and component C indicates that component C is dependent upon component D). Arc 106 between component C and component B indicates that component B is dependent upon component C. Arc 108 between component B and component A indicates that component A is dependent upon component B.

The relationships among the components of FIG. 2 define an example of component dependency order in which components D and E are first in order since they are the base components that have no dependency upon any other component in the system 100. Component C is second in order since component C depends upon components D and E. Component B is third in order since component B depends upon component C. Component A is fourth in order since component A depends upon component B.

Components A-E may be constituents of a call graph embedded within other computer program code (not shown), which may be part of a software code based system stored in a non-transitory computer readable device, and the dependency relationships may be caller/callee relationships, for example. Continuing with the call graph example, component A is a caller of component B, and component B is a callee of component A. Moreover, continuing further with the call graph example, each component may be associated with a function. A caller component is associated with a function that calls a function associated with a callee component. Thus, component A can be associated with a function that calls a function associated with component B. It will be appreciated that a component can be a caller relative to one component in a call graph and a cal lee relative to another function in the call graph. For example, component B is a callee relative to component A and is a caller relative to component C.

Alternatively, for example, components A-E may be constituents of a class inheritance graph embedded within other computer program code (not shown), which may be part of a software-based system stored in a non-transitory computer readable device, and the dependency relationships may be superclass/subclass relationships, for example. Continuing with the inheritance graph example, component A is a superclass of component B, and component B is a subclass of component A. Moreover, continuing further with the inheritance graph example, each component may be associated with a class definition. A superclass component is associated with a class definition that is inherited by a class associated with a subclass component. Thus, component A can be associated with a class that is inherited by the class associated with component B. It will be appreciated that a component can be a subclass relative to one component in an inheritance graph and a superclass relative to another component in the inheritance graph. For example, component B is a subclass relative to component A and is a superclass relative to component C.

Alternatively, for example, components A-E may be constituents of a graph that indicates instantiations of modules within a software-based representation of a hardware design stored in a non-transitory computer readable device, for example. Continuing with the instantiation graph example, component A is a user of component B, and component B is an instantiation of a hardware module in component A. Moreover, continuing further with the instantiation graph example, each component could be associated with a module definition in a hardware description language.

Component Dependency Graph Structure

Figure 3:
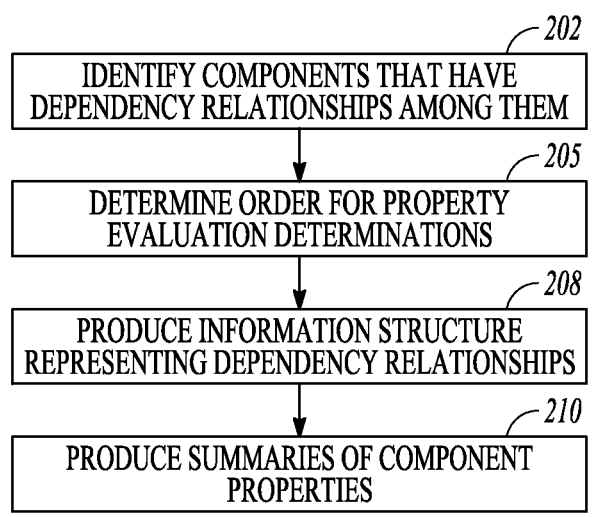
FIG. 3 is an illustrative flow diagram representing a process to identify dependency relationships among components of a system and to construct property evaluation summaries associated with components identified as having dependency relationships among them in accordance with some embodiments.

FIG. 3 is an illustrative flow diagram representing a process 200 to identify dependency relationships among components of a system and to construct property evaluation summaries associated with components identified as having dependency relationships among them in accordance with some embodiments. A property evaluation summary includes indicia of property evaluations for one or more properties associated with a component. Thus, for example, if a given component is associated with three properties, then a property evaluation summary corresponding to that given component provides indicia of property evaluations for those associated three properties.

Module 202 configures a computer system to identify components that have a dependency relationship with each other. For example, this may be done by scanning the code of each component in a computer code based system for references to other components in the system. In some embodiments, for example, module 202 configures a computer system to identify dependency relationships among components that include computer code functions. For example, a first component that includes a first function is determined to depend upon a second component that includes a second function if the first function calls the second function. Alternatively, in some embodiments, for example, module 202 configures a computer system to identify dependency relationships among components that include computer code class objects. For example, a first component that includes a first class object is determined to depend upon a second component that includes a second class object if the first class object includes the second class object.

Module 205 determines an optimal order of property evaluation determinations among components. In some embodiments, for example, property evaluation determinations are performed for depended upon components before they are performed for dependent components. Specifically, for example, components may be ordered so that where a first component depends upon a second component, the first and second components are ordered with the second component preceding the first component in the order. Moreover, in some embodiments, a component having a larger number of dependent components may be ordered ahead of its dependent components in the component ordering. Module 208 configures a computer system to produce a dependency graph information structure in a computer readable storage device that represents the determined dependency relationships and ordering.

Module 210 configures a computer system to determine property evaluations for the components of the system, and to store the summaries of the property evaluations in a non-transitory computer readable storage device in association with indicia, such as component names, of the components that they represent. In some embodiments, a property evaluation for a given dependent component takes into account a property evaluation for a depended upon component. More particularly, for example, in some embodiments the module 210 uses a property deriver to configure a computer system to evaluate a given property of a given component to determine a property evaluation and to use the determined property evaluation to determine a property evaluation for another component that is dependent upon the given component. Even more particularly, for example, in some embodiments the module 210 configures a computer system to determine a property evaluation for a property of a dependent component based upon a property evaluation of the same property for a component that that the dependent component depends upon.

Figure 4:
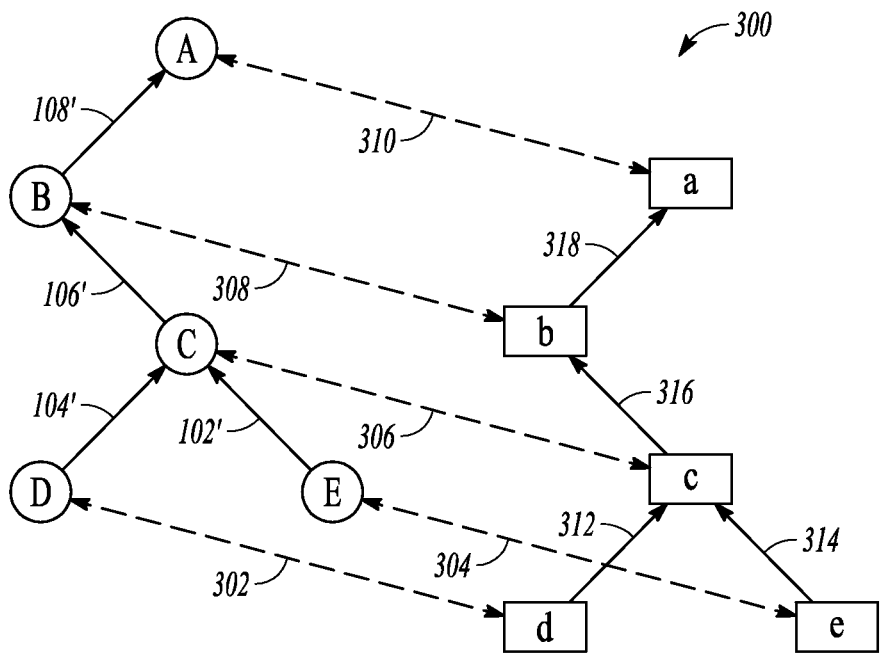
FIG. 4 is an illustrative dependency graph data structure that is produced according to the process of FIG. 3 and that is stored in a non-transitory computer readable storage device in accordance with some embodiments.

FIG. 4 is an illustrative dependency graph information structure 300 that is produced according to modules 202-210 of FIG. 3 and that is stored in a non-transitory computer readable storage device in accordance with some embodiments. The illustrative data structure 300 includes within it the components A-E having associations between them 102'-108' that correspond to the dependency relationships 102-108 described with reference to FIG. 2. The components A-E of the example dependency graph information structure 300 are respectively associated in the storage device with corresponding property evaluation summaries 'a'-'e'. Each property evaluation summary is associated in the storage device with a corresponding component in the data structure 300. Specifically, the example data structure of FIG. 4 provides an association 302 between property evaluation summary 'd' and component D; provides an association 304 between property evaluation summary 'e' and component E; provides an association 306 between property evaluation summary 'c' and component C; provides an association 308 between property evaluation summary 'b' and component B; and provides an association 310 between property evaluation summary 'a' and component A.

It will be appreciated that in this illustrative example, components D and E have the fewest dependencies (none). Whereas, component A has the largest number of dependencies since it is dependent upon components B, C, D and E. The data structure 300 provides associations between the summaries that order the summaries in the component dependency order, also referred to herein as a 'sort order' such that each property evaluation summary is ordered relative to other summaries according to the ordering determined for the component with which it is associated. As explained above, in some embodiments, the ordering of the summaries follows the dependency relationships among the corresponding components. In some embodiments, the data structure 300 includes associations 312, 314 that indicate that property evaluation summary 'c' depends upon the summaries 'd' and 'e'; includes association 316 that indicates that property evaluation summary 'b' depends upon the property evaluation summary 'c'; and that includes association 318 that indicates that property evaluation summary 'a' depends upon the property evaluation summary 'b'.

Determining Component Property Evaluation Summaries

As explained more fully below, in some embodiments, property evaluation summaries are determined in a sort order in which summaries are determined for depended upon components before summaries are determined for corresponding dependent components. In some embodiments, the sort order is a topological sort order defined by a dependency graph data structure such as the structure 300. Thus, referring to the example of FIG. 4, for example, the summaries 'd' and 'e' are determined before the property evaluation summary 'c'. The property evaluation summary 'c' is determined before the property evaluation summary 'b'. The property evaluation summary 'b' is determined before the property evaluation summary 'a'.

Figure 5:
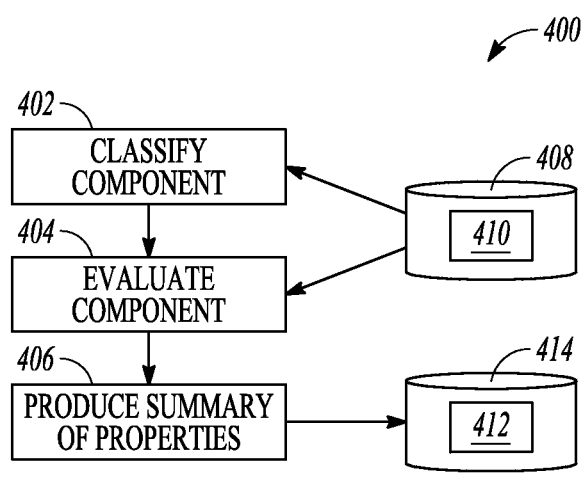
FIG. 5 is an illustrative drawing representing a process to summarize properties of a component in accordance with some embodiments.

FIG. 5 is an illustrative drawing representing, in general terms, a process 400 to summarize property evaluations of a component in accordance with some embodiments. Module 402 configures a computer system to examine a component to classify the component so as to identify one or more property derivers to associate with the component. More specifically, a non-transitory storage device 408 stores a component evaluation information structure 410 that indicates associations between component classifications and property derivers. Module 404 configures a computer system to use the property derivers determined to be associated with a component based upon its classification to produce corresponding property evaluations for the component. Module 406 produces a property evaluation summary information structure 412 that stores a property evaluation summary of the property evaluations determined for a component in a non-transitory storage device 414. It will be appreciated that different kinds of components may potentially are associated with different kinds of property derivers that determine different kinds of property evaluations.

The first two columns of Table A below show an example component evaluation information structure 410 stored in the storage device 408 in accordance with some embodiments. The first column sets forth classifications. Two different kinds of example classifications are set forth in the first column: function and class definition. The second column identifies and has associations with four different property evaluation derivers used to determine four different property evaluations. Referring to Table A, the 'function' classification is associated with three property derivers, and the 'class definition' classification is associated with one property deriver. The third column of Table A shows examples of different alternative property evaluations that can be determined using the different property evaluation derivers.

TABLE A

| Component Classification | Property Derivers | Possible Property Evaluations |
|---|---|---|
| Function | Property deriver checker to determine whether this function return a null pointer value? | {yes, no, maybe} |
| Function | Property deriver checker to determine whether this function dereference its argument? | {always, never, sometimes} |
| Function | Property deriver checker to determine whether a return value of this function is a result of memory allocation operation? | {yes, no} |
| class definition' (in some object oriented programming language) | Property deriver checker to determine a size of an instantiated class in bytes | Size of instantiated class in bytes |

Table B sets forth some examples of potential inferences concerning computer program code defects that can be arrived at based upon certain property evaluations. These inferences may provide indicia of code defects and/or code vulnerabilities, for example.

TABLE B

| Property Evaluations (deriver determination) | Inference (for code calling the function) |
|---|---|
| Yes - null pointer value?) | If a function definitely can return a null pointer value, the code calling the function must handle that possibility |

TABLE B-continued

| Property Evaluations (deriver determination) | Inference (for code calling the function) |
|---|---|
| No - (null pointer value?) | If a function definitely CAN NOT return a null pointer value, the code calling the function does NOT need to handle that possibility |
| Maybe - (null pointer value?) | If a function may return a null pointer value, the code calling the function must handle that possibility |
| Always - (dereference its argument?) | If a function dereferences its argument, the code calling the function must ensure that the argument's value cannot be null |
| Never - (dereference its argument?) | If a function dereferences its argument, the code calling the function does NOT need to ensure that the argument's value cannot be null |
| Sometimes - (dereference its argument?) | If a function dereferences its argument, the code calling the function must ensure that the argument's value cannot be null |
| Yes - (memory allocation operation?) | If a function performs a memory allocation operation, the code calling the function needs to ensure that the memory is subsequently deallocated |
| No - (memory allocation operation?) | If a function performs a memory allocation operation, the code calling the function does NOT need to ensure that the memory is subsequently deallocated |
| Size - (determine size of instantiated class in bytes) | Layout of memory in the code containing the class depends on the size of the class. |

It will be appreciated, therefore, that component property evaluations can provide indicia of potential sources of defects and/or vulnerabilities within a system. Tests may be employed based upon these property evaluations, to ascertain whether such potential defects and/or vulnerabilities actually exist. Component property evaluations, therefore, can be used to determine appropriate testing strategies. For example, if a first function has the property evaluation indicating that it can return a null pointer, then it may be appropriate implement a test of whether a second function calling that first function can handle the possibility of a returned null pointer.

Referring again to FIG. 5 and to Table A, assume for example that module 402 configures a computer system to parse code (not shown) of a currently selected component of a system to determine a classification for the selected component. Further, assume that the module 402 determines that the currently selected component is to be classified as a function. Module 404 configures the computer system to reference the information indicated in Table A and to use a property evaluation deriver corresponding to the determined classification to determine property evaluations for the currently selected component. Module 406 configures the computer system to produce a property evaluation summary structure that indicates the determined property evaluations for the currently selected component.

Assume, for example, that module 402 determines that the currently selected component is classified as a function. Moreover, assume for example, that module 404 determines that the function cannot return a null pointer value; that the particular function sometimes dereferences its argument; and that the return value of this particular function is not a result of a memory allocation operation. In that case, module 406 produces a property evaluation summary information structure 412 for the component that indicates that the component, which has been classified as a function, cannot return a null pointer value, sometimes dereferences its argument is not a result of a memory allocation operation.

Table C shows example property evaluation summary information structure 412 stored in the storage device 414 corresponding to the example function classification in accordance with the foregoing hypothetical example and in accordance with some embodiments.

TABLE C

| Component Classification | Property Evaluations (deriver determination) |
|---|---|
| Function | Yes - (Can this function return a null pointer value?) |
| Function | Sometimes - (Does this function dereference its argument?) |
| Function | No - (Is the return value of this function a result of memory allocation operation?) |

Still referring to FIG. 5 and to Table A, further assume for example that the computer system configured according to module 402 parses the code of another component and determines that the component is to be classified as a 'class definition'. Module 404 configures the computer system to reference the information indicated in Table A and to use property derivers corresponding to the determined 'class definition' classification to determine property evaluations for the currently selected component. Module 406 configures the computer system to produce a property evaluation summary structure that indicates the determined property evaluations for the currently selected component. Suppose, for example, that module 404 determines that a given class definition has an instantiated class size of 10K bytes. In that case, module 406 produces a property evaluation summary information structure 412 for the component that indicates that the component, which has been classified as a class definition, has an instantiated class size of 10K bytes.

Table D shows example property evaluation summary information structure 412 stored in the storage device 414 corresponding to the example 'class definition' classification in accordance with the foregoing hypothetical example and in accordance with some embodiments.

TABLE D

| Component Classification | Property Evaluations (deriver determination) |
|---|---|
| class definition' (in some object oriented programming language) | 10K bytes - (Size of instantiated class in bytes) |

It will be appreciated that the property evaluation summary information structure 412 as instantiated in Tables C and D contains mere summaries since the information does not describe the component in detail but merely indicates some properties of the components. It will be appreciated that a component can have multiple classifications, e. g, both a function and class definition.

Figure 6A:
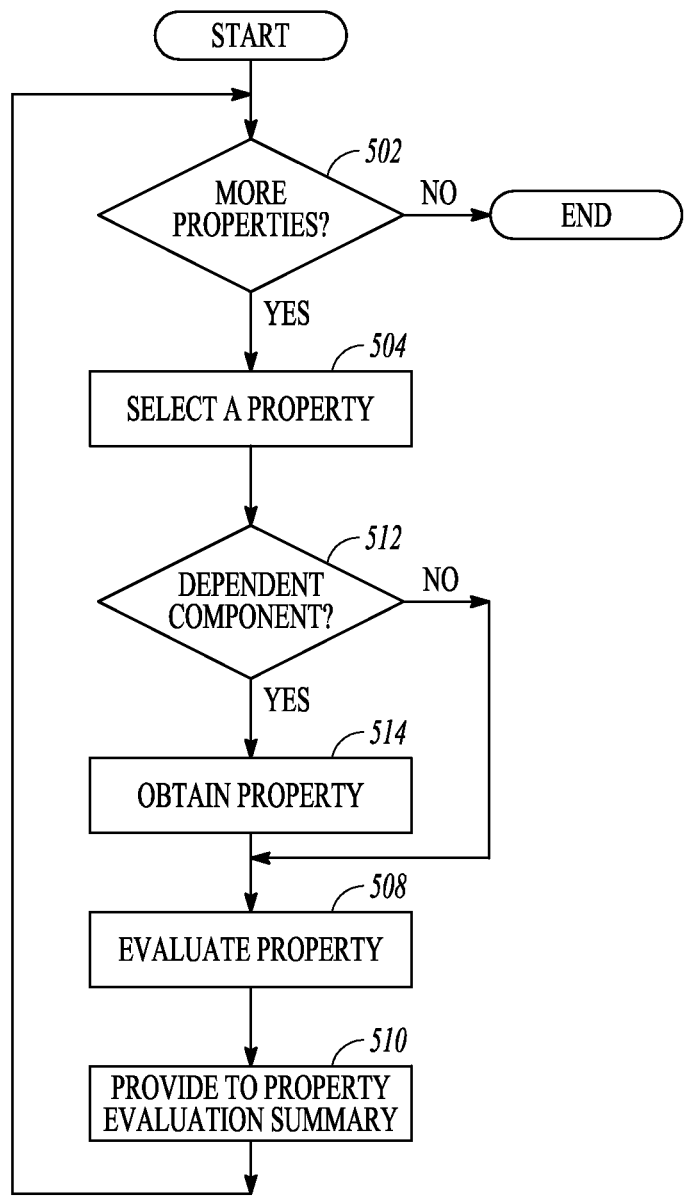
FIG. 6A is an illustrative flow diagram that shows additional details of a process to produce a property evaluation for a selected component in accordance with some embodiments.

FIG. 6A is an illustrative flow diagram that shows additional details of a process 500 to produce a property evaluation for a selected component in accordance with some embodiments. In particular, the process 500 represents certain details of module 404 of FIG. 5 in accordance with some embodiments. It will be appreciated that the process 500 of FIG. 6A is described relative to a selected component, and that a component evaluation information structure 410 may classify the selected component as being associated with one or more property derivers. Moreover, it will be appreciated that respective property evaluations produced using such derivers may depend upon corresponding property evaluations determined using the same derivers but for a different component that the currently selected component is dependent upon.

Decision module 502 configures a computer system to determine whether there is another property deriver indicated in structure 410 that has not yet been invoked to configure a computer system to determine a property evaluation for a currently selected component. In response to a determination that there are no more property derivers to be invoked, then the process 500 ends and a next component may be selected for evaluation according to the processes of FIG. 5. On the other hand, in response to a determination that there is another property deriver to be invoked for the currently selected component, then control flows to module 504, which configures the computer system to select a next property evaluation deriver from the component evaluation information structure 410.

Next, control flows to decision module 512, which configures the computer system to determine whether the selected component is dependent upon another component and to identify that depended upon component. In some embodiments, as described more fully below, for example, a determination as to whether the currently selected component is dependent upon another component is made by scanning code of the selected component to identify a call or a reference to another component and by using an identified call or reference to another component as an indication that the currently selected component is dependent upon the called or referenced component. Alternatively, for example, in other embodiments as described more fully below, for example, a determination as to whether the currently selected component is dependent upon another component is made through reference to a component dependency graph data structure of the general type shown in FIG. 4, for example. Such component dependency graph data structure indicates dependency relationships that involve the currently selected component.

In response to a determination by decision module 512 that the currently selected module is not dependent upon another component, control flows to module 508, which uses the currently selected property deriver to configure the computer system determine a property evaluation for the selected property. Next, control flows to module 510, which configures the computer system to communicate the property evaluation determined for the selected property to module 406 for inclusion in a property evaluation summary 412 associated with the currently selected component. Control then flows back to decision module 502.

In response to a determination by decision module 512 that the currently selected module is dependent upon another component, control flows to module 514, which configures the computer to obtain a property evaluation determined for the currently selected property with respect to the identified depended upon component. In response to obtaining a property evaluation for the currently selected property, for the identified depended upon component control flows to module 508, which uses the currently selected property deriver to configure the computer system to determine a property evaluation for the selected property. It will be appreciated that where a property evaluation is obtained for a depended upon component, the selected property deriver configures the computer system to take into account the obtained property evaluation in determining a property evaluation for the currently selected component, which depends upon that depended upon component. Control flow then proceeds to modules 510 and 502 as described above.

FIG. 6B1 is an illustrative flow diagram representing in general terms an example property evaluation deriver process 600 in accordance with some embodiments. Module 602 configures a computer system to parse code of a selected component. Parsing code typically involves traversal of one or more code paths within a component. Module 604 configures a computer system to determine a property evaluation in the course of the parsing of the code. Module 606 configures a computer system to store a determined property evaluation in a property evaluation summary information structure 412 that corresponds to the selected component. It will be appreciated that multiple different property evaluation derivers may be invoked to derive multiple different property evaluations for a selected component, and that a summary of these multiple property evaluations may be stored in the information structure 412.

FIG. 6B2 is an illustrative flow diagram representing in general terms a process 620 of module 604 of FIG. 6B1 in accordance with some embodiments. Decision module 622 configures the computer system to determine whether a propagated evaluation corresponding to a depended upon component has been propagated to a currently selected component for which a property evaluation is being determined. In response to a determination that a property evaluation corresponding to a depended upon component has been propagated to the currently selected component, decision module 624 configures the computer system to determine whether the propagated property propagates to a property evaluation determination for the currently selected component. In response to a determination that the property evaluation propagated to the currently selected component is propagated to a property evaluation determination for the currently selected component, then module 626 configures the computer system to determine the property evaluation corresponding to the currently selected component, taking into account the property evaluation corresponding to a depended upon component that has been propagated to the currently selected component. In response to decision module 622 determining that there is no property evaluation corresponding to a depended upon component propagated to the currently selected component, then module 628 configures the computer system to determine the property evaluation without taking into account a property evaluation corresponding to such depended upon component. Likewise, in response to decision module 624 determining that there is no property evaluation propagated to the current property evaluation determination, then module 628 configures the computer system to determine the property evaluation without taking into account a property evaluation corresponding to a depended upon component.

Persons of ordinary skill in the art will understand that details of individual property evaluation derivers depend upon contextual factors such as the property evaluation to be performed and the component to be evaluated. Moreover persons of ordinary skill in the art will understand how to implement property evaluation derivers, which are a particular kind of checker program, used to determine property evaluations. Therefore, property evaluation derivers and the manner in which property derivers take into account property evaluations determined for depended upon components form no part of the present invention and need not be described in detail herein.

In the following explanation, it will be appreciated that the terms "descending" and "ascending" are to be understood in the context of the disclosed embodiments. In this context, the term "descending" indicates a code path in a direction from a dependent component to a depended upon component. In this context, the term "ascending" refers to a code path in a direction from a depended upon component to a dependent component.

FIGS. 6C1-6C2 are illustrative flow diagrams that represent a process to obtain a property evaluation that involves following a descending code path (FIG. 6C1) and an ascending code path (FIG. 6C2) to obtain a property evaluation for a component in accordance with some embodiments. In particular, the process represents certain aspects of some embodiments of the module 514 of FIG. 6A in accordance with some embodiments. The drawings in FIGS. 6C1-6C2 use the example components A-E of FIG. 2 and FIG. 4 and their dependency relationships to illustrate the recursive nature of the process 530. The process of 530 is recursive and occurs in component-by-component stages.

FIG. 6C1 illustrates a component-by-component flow path that proceeds in stages, $A_d$ to $B_d$ to $C_d$ to $D_d$ and $E_d$, component-by-component through the components of example system 200 in descending order of dependency, from a currently selected component A through to base components D and E, to identify the base property evaluation(s) upon which property evaluations for the other components depend. As used herein, a base component within a system is a component that acts as a depended upon component but does not act as a dependent component.

FIG. 6C2 illustrates a component-by component path that proceeds in stages, $D_a$ and $E_a$ to $C_a$ to $B_a$ to $A_a$, component-by-component through the components of example system 200 in ascending order of dependency, from base components D and E to the currently selected component A, to determine and propagate property evaluations from the base components D and E to the currently selected component A.

Thus, in combination, FIGS. 6C1-FIG. 6C2 illustrate that in effect, the process 530 flows or "ripples" through the system 200, from one component to the next, in both descending and ascending order according to dependency relationships among components.

Referring now to FIG. 6C1, there are shown five descending stages. A first descending stage, labeled $A_d$, corresponds to component A. A second descending stage labeled $B_d$, corresponds to component B. A third descending stage labeled $C_d$, corresponds to component C. Fourth and fifth descending stage labeled $D_d$ and $E_d$, corresponds to components D and E.

In the following description, it will be appreciated that certain modules of the illustrative process 500 are invoked multiple times in order to determine property evaluations for each of the components A-E. Furthermore, in order to simplify the following explanation reference is made to only a single property evaluation although it will be appreciated that each invocation of the process 500 may involve multiple property evaluations. Moreover, it will be understood that when the process 500 is invoked for a dependent component, it must await propagation of property evaluations for the depended upon component(s) upon which it depends. Furthermore, it will be understood that in the example involving the combination of FIGS. 6C1-6C2, dependency relationships are identified during a descending traversal of components, and property evaluations are determined during an ascending traversal of components.

Still referring to FIG. 6C1, during the first descending stage, labeled $A_d$, decision module 512 scans the code 513A of component A, as indicated by the dashed lines, and determines that component A is a dependent component that is dependent upon component B. Referring to both stages $A_d$ and $B_d$, in response to the determination at stage $A_d$ that component A is a dependent upon component B, module 514 of stage $A_d$, causes control flow to flow to decision module 512 in stage $B_d$, which configures the computer system to scan the code 513B of component B, indicated by dashed lines, and to determine that module B is dependent upon component C. Referring to both stages $B_d$ and $C_d$, in response to the determination at stage $B_d$ that component B is dependent upon component C, module 514 of in stage $B_d$ causes control flow to flow to decision module 512 in stage $C_d$. Module 512 in stage $C_d$ configures the computer system to scan the code 513C of component C, indicated by dashed lines, and determines that module C is dependent upon both component D and component E. Referring to stages $C_d$, $D_d$ and $E_d$, in response to the determination at stage $C_d$ that component C is dependent upon components D and E, control flows, to module 514 of stage $C_d$, which in turn, causes control to flow to first to decision module 512 in stage $D_d$, and subsequently, to decision module 512 in stage $E_d$. Decision module 512 of stage $D_d$ configures the computer system to scan the code 513D of component D, indicated by dashed lines, and to determine that module D is a base component that is not dependent upon another component. Decision module 512 of stage $E_d$ configures the computer system to scan the code 513E of component E, indicated by dashed lines, and to determine that module E is a base component that is not dependent upon another component.

Referring now to FIG. 6C2, there are shown four ascending stages. A first and second ascending stages, labeled $D_a$ and $E_a$, corresponds to components D and E. A third ascending stage labeled $C_a$, corresponds to component C. A fourth ascending stage labeled $B_a$, corresponds to component B. A fifth ascending stage labeled $A_a$, corresponds to component A Still referring to FIG. 6C2, in accordance with the example component relationships of FIGS. 2 and 4, during the ascending stage, labeled $D_a$, module 508 configures the computer system to use a currently selected property deriver 600 associated with the component evaluation information structure 410 to configure the computer system to parse and evaluate the code 513D of component D), produce a property evaluation 650D for component D, and store the produced property evaluation in a property evaluation summary information structure 412D associated with component D.

Similarly, during the ascending stage, labeled $E_a$, module 508 configures the computer system to use the selected property deriver associated with the component evaluation information structure 410 to configure the computer system to parse and evaluate the code 513E of component E, produce a property evaluation 650E for component E, and store the produced property evaluation in a property evaluation summary information structure 412E associated with component E.

Referring to ascending stages $D_a$, $E_a$ and $C_a$, the respective property evaluations 650D and 650E that are determined in ascending stages $D_a$ and $E_a$ for components D and E are propagated to module 514 of stage $C_a$. Module 508 of stage $C_a$ configures the computer system to use the selected property evaluation deriver 600 associated with the component evaluation information structure 410 to configure the computer system to parse and evaluate the code 513C of component C, produce a property evaluation 650C for component C, and to store the produced property evaluation in a property evaluation summary information structure 412C associated with component C. In the course of the traversal, module 514 of stage $C_a$ configures the computer system to provide the respective property evaluations 650D and 650E determined for components D and E to the deriver 600, which in turn, associates the property evaluations with code 513C1 within component C. The association, indicated by respective lines 651D and 651E between property evaluations 650D and 650E and code 513C1 of component C, are provided in a computer readable storage device. Thus, the deriver 600 can take into account the property evaluations 650D and 650E determined for components D and E, which are depended upon by component C, in determining a property evaluation for component C.

Referring to ascending stages $C_a$ and $B_a$, the property evaluation 650C that is determined in ascending stage $C_a$ for component C is propagated to module 514 of stage $B_a$. Module 508 of stage $B_a$ configures the computer system to use the selected property evaluation deriver 600 associated with the component evaluation information structure 410 to configure the computer system to parse and evaluate the code 513B of component B, produce a property evaluation 650B for component B, and store the produced property evaluation in a property evaluation summary information structure 412B associated with component B. In the course of the traversal, module 514 of stage $B_a$ configures the computer system to provide the property evaluation 650C determined for component C to the deriver 600, which in turn, associates the property evaluation with code 513B1 within component B. The association, indicated by line 651C between property evaluation 650C and code 513B1 of component B, is provided in a computer readable storage device. Thus, the deriver 600 can take into account the property evaluation 650C determined for component C, which is depended upon by component B, in determining a property evaluation for component B.

Referring to ascending stages $B_a$ and $A_a$, the property evaluation 650B that is determined in ascending stage $B_a$ for component B is propagated to module 514 of stage $A_a$. Module 508 of stage $A_a$ configures the computer system to use the selected property evaluation deriver 600 associated with the component evaluation information structure 410 to configure the computer system to parse and evaluate the code 513A of component A, produce a property evaluation 650A for component A, and store the produced property evaluation in a property evaluation summary information structure 412A associated with component A. In the course of the traversal, module 514 of stage $A_a$ configures the computer system to provide the property evaluation 650B determined for component B to the deriver 600, which in turn, associates the property evaluation with code 513A1 within component A. The association, indicated by line 650A between property evaluation 650B and code 513A1 of component A, is provided in a computer readable storage device. Thus, the deriver can take into account the property evaluation 650B determined for component B, which is depended upon by component A, in determining a property evaluation for component A.

Alternatively, rather than traverse both a component-by-component descending path and a component-to-component ascending path as described with reference to FIGS. 6C1-6C2, a dependency graph data structure can be used to guide an ascending component-to-component flow during which property evaluations are determined, thus obviating the need for a descending path. More specifically, for example, the example dependency graph 300 of FIG. 4 can be used to indicate dependency relationships among components so that the component-by-component path from components D and E shown in FIG. 6C2 can be traversed without the need to first traverse the descending path of FIG. 6C1 to discern the relationships among components.

Change Impact Analysis

As explained below, a comparison of property evaluations determined for corresponding components before and after a change to one or more components can be used to provide an indication of an impact of a change to a depended upon component upon a dependent component. By way of explanation, it will be appreciated that a property evaluation for a component may change when the code of the component is changed. Moreover, it will be appreciated that that a change in a property evaluation for a component can be indicative of a change in component behavior resulting from such component code change. Thus, by extension, a change in a property evaluation that is propagated for use as input to a deriver to determine a property evaluation for a dependent component may result in a change in the property evaluation for a dependent component. Therefore, as explained more fully below, propagation of a property evaluation determined by a deriver for a depended upon component for use as input to the deriver in determining a property evaluation for a dependent component can be used to provide an indication of an impact of a change in the depended upon component upon the dependents component.

Figure 7:
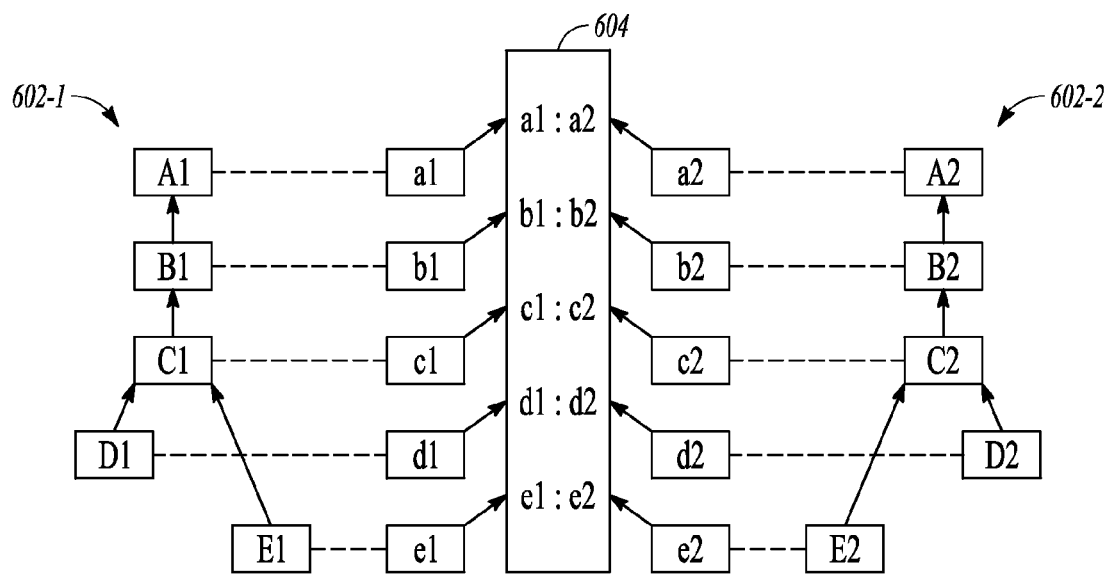
FIG. 7 is an illustrative drawing representing relationships among the first and second dependency graph data structures, associated property evaluation summaries and a comparator configured to compare the property evaluation summaries in accordance with some embodiments.

FIG. 7 is an illustrative drawing representing relationships among the first and second dependency graph data structures 602-1, 602-2 produced and stored, respectively, in a non-transitory computer readable storage device, property summaries a1-e1 and a2-e2 associated with the respective data structures and a comparator structure 604 configured to compare the property summaries in accordance with some embodiments. In this illustrative example, components A1-E1 and components A2-E2 have the illustrative dependency relationships shown for the components in FIG. 4. Moreover, in this example, it is assumed that components A1-E1 are instantiations of certain components at some given time, and components A2-E2 are instantiations of substantially the same, or at least corresponding, components, at some different time. It is assumed in this example that some change has been made to one or more of the components between the two times such that one or more of the components A1-E1 is not identical to one or more of the corresponding components A2-E2. Thus, for example, the first version may be an earlier version of a collection of components and the second version may be a later, modified version of the collection of components. For example, for software based components, the code of one or more of the components A1-E1 may be modified to be different from the code of one or more of the corresponding components A2-E2.

The process 200 of FIG. 3 is used to generate the first dependency graph data structure 602-1 and to produce the second dependency graph data structure 602-2. The processes 400, 500 of FIGS. 5, 6A and 6C are used to produce property summaries a1-e1, which correspond to components A1-E1, and to produce property summaries a2-e2, which correspond to components A2-E2. A computer system is configured to implement a comparator 604 to compare corresponding property summaries to determine whether the individual properties match. Specifically, the comparator 604 compares property summaries a1 and a2; compares property summaries b1 and b2; compares property summaries c1 and c2; compares property summaries d1 and d2; and compares property summaries e1 and e2. In some embodiments, checksums are computed or hashes are computed to represent the summaries so as to facilitate ease of comparison.

A mismatch of properties of corresponding property summaries indicates that a change in corresponding components (e.g., a code change) has an impact upon a component property. That changed property, for example, may be indicative of a change in behavior of a component. It will be appreciated that since the process 500 can result in a property change rippling up through the property summaries from a property evaluation summary of a changed depended-upon component to the property summaries of components that depend upon the changed component.

For example, assume that change occurs as between component D1 and component D2 such that D1 and D2 are different, e.g., a code change. Moreover, assume that the change results in components D1 and D2 having one or more corresponding property evaluations that differ from each other. (Recall that each component may be associated with multiple property derivers and multiple corresponding property evaluations.) Further, for example, assume that processes 400, 500 produce property evaluation summaries d1 and d2 that differ due to the one or more differing property evaluations as between components D1 and D2. Still further, for example, assume that processes 400, 500 produce property evaluation summaries c1 and c2 that also differ due to the one or more differences in property evaluation summaries d1 and d2. Thus, for example, differences between the property evaluation summaries c1 and c2 provides an indication that the change or difference between components 1D and D2 has an impact upon components C1 and C2 even though components C1 and C2 are themselves unchanged. Thus, in this example, the result of the comparison of property summaries c1 and c2 indicates that the change as between D1 and D2 does impact components C1 and C2.

Conversely, assume instead, for example, that although a change as between components D1 and D2 results in differences between property evaluation summaries d1 and d2, property summaries c1 and c2 match. It will be appreciated that the matching property summaries c1 and c2 indicates that changes in one or more of the properties of D1 and D2 does not impact properties of C1 and C2. Thus, in this alternate example, the result of the comparison of property evaluation summaries c1 and c2 indicates that the change as between D1 and D2 does not impact components C1 and C2.

Detecting an impact of a change to a depended upon component that has been changed upon a dependent component that has not been changed can be important to development and testing of a system. For example, in response to such change impact, additional testing and/or code review may be performed; code may be refactored (e.g., rewritten or changed in structure without changing functions); human auditing of code may be performed; or a risk assessment may be performed to assess the costs of further modifying the code as compared with the risk of not modifying it. Thus, change impact analysis can be used to identify a dependent component that may require further attention because it is impacted by a change in an depended upon component even though the component has not itself changed from one version to the next. Conversely, change impact analysis can be used to avoid unnecessary component testing by determining what dependent components are not impacted by a change to a dependent component with which they have a dependency relationship.

EXAMPLES

The following examples involve systems that include multiple components that have dependency relationships. The components in these examples are implemented with computer program code. Sequences of versions of the systems are shown in which one or more components changes from one version to the next. The examples illustrate the use of change impact analysis to determine whether a change to a depended upon component has an impact upon a dependent component in accordance with some embodiments.

The following examples involve components that include classes that include functions. Table E describes their dependency relationships among the components.

TABLE E

| Class | Description |
| --- | --- |
| Class Bla | which is some base class |
| Class Bar | with method function2 which instantiates an object of class Bla |
| Class Foo | with method function1 which calls function2 of class Bar |

It is assumed in these examples that the example component evaluation information structure of Table A is used to evaluate the components of the examples.

Figure 8:
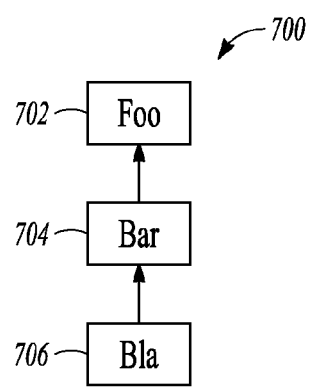
FIG. 8 is an illustrative drawing representing a dependency graph data structure that sets forth dependency relationships among components Foo, Bar and Bla in accordance with some illustrative examples.

FIG. 8 is an illustrative drawing representing a dependency graph data structure 700 stored in a non-transitory computer readable storage device that sets forth dependency relationships among components Foo, Bar and Bla in accordance with some illustrative examples. The process of 200 illustrated with reference to FIG. 3 can be used to produce the information structure 700 that indicates the dependency relationships among these components. Component Foo 702 is dependent upon component Bar 704. Component Bar 704 is dependent upon component Bla 706.

Code Example 1

In this example, a sequence of three changes occur to the components as follows: original version→revision 1→revision 2→revision 3

FIG. 9A shows an illustrative original version 802 of first example code stored in a non-transitory computer readable storage device.

FIG. 9B shows an illustrative first revision 804 of first example code stored in a non-transitory computer readable storage device.

FIG. 9C shows an illustrative second revision 806 of first example code stored in a non-transitory computer readable storage device.

FIG. 9D shows an illustrative third revision 808 of first example code stored in a non-transitory computer readable storage device.

A comparison of FIGS. 9A-9B is used to illustrate that a change in code of a component does not necessarily result in a change in a property evaluation of the component. Referring to FIGS. 9A and 9B, as between the original version 802 shown in FIG. 9A and the first revision 804 shown in FIG. 9B, a change is made to the code in that a statement to cause a printout of an error message 810 is added to function2 ( ) as it appears in the first revision 804.

Figure 10A:
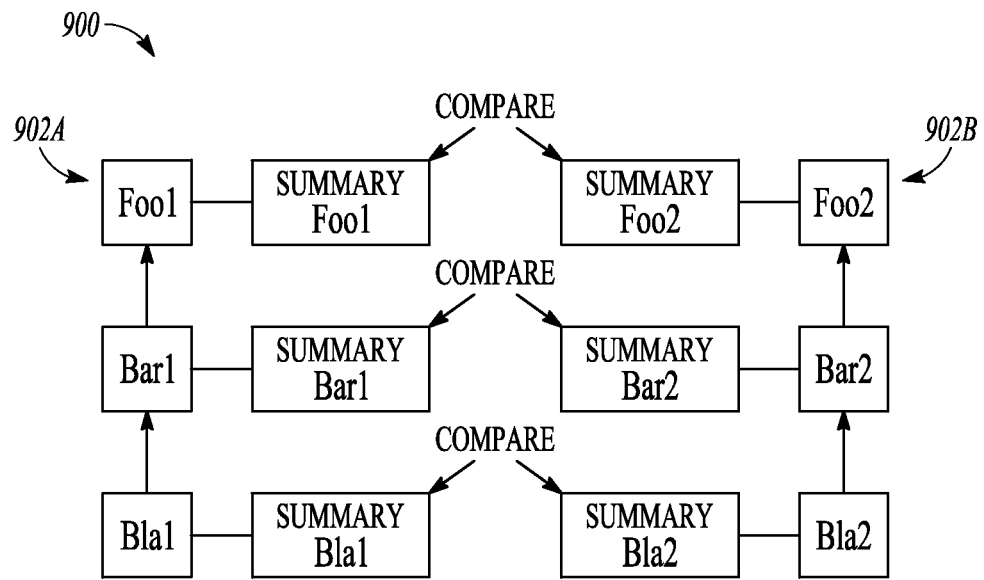
FIGS. 10A-10B are illustrative drawings showing respective dependency graph data structures (FIG. 10A) and property evaluation summary structures (FIG. 10B) that correspond to a comparison the code of the base version and first revision of FIGS. 9A-9B in accordance with some embodiments.

FIG. 10A shows a dependency graph data structure 902A produced in computer readable storage in accordance with the process 200 of FIG. 3 to represent the original version 802. FIG. 10A also shows a dependency graph data structure 902B produced in computer readable storage in accordance with the process 200 of FIG. 3 to represent the first revision 804. In accordance with the processes 400, 500 of FIGS. 5-6A, property evaluation summary Bla1 is produced that corresponds to component Bla1; property evaluation summary Bar1 is produced that corresponds to component Bar1; and property evaluation summary Foo1 is produced that corresponds to component Foo1. Also, in accordance with the process 400 of FIG. 5, property evaluation summary Bla2 is produced that corresponds to component Bla2; property evaluation summary Bar2 is produced that corresponds to component Bar2; and property evaluation summary Foo2 is produced that corresponds to component Foo2.

Figure 10B:
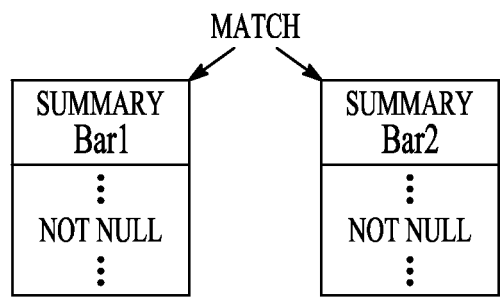

FIG. 10B shows certain details of a property evaluation summary data structure produced in accordance with the processes 400, 500 of FIGS. 5-6A for the original version 802 and the first revision 804. In this example, the component evaluation information structure of Table A is used to produce the property evaluation information structure summaries. The evaluation structure of Table A includes property evaluation deriver that asks whether the function can return a null value. Focusing only on function2 ( ), the function that changed as between the original version 802 and the first revision, 804, it can be seen that the property evaluation as to the null value for Bar1 and property evaluation Bar2 match (i.e. both are "not null") despite the change in code relating to function2 ( ). Thus, it will be appreciated that a change in code of a depended upon component does not necessarily have a property evaluation change impact upon a dependent component.

Moreover, the property evaluation for function2 ( ) for Bar1 is propagated to the deriver invoked to determine a property evaluation for Foo1, and the deriver associates the propagated property evaluation with and function2 ( ) code in Foo1. However, in this case, the deriver determines that Foo1 does not utilize function2 ( ), since function2 ( ) has a pointer to component Bar and does not actually instantiate component Bar, and therefore the propagated property evaluation for Foo1 has no impact upon the property evaluation of Foo1. Similarly, the property evaluation for function2 ( ) for Bar2 is propagated to the deriver invoked to determine a property evaluation for Foo2, and the deriver associates the propagated property evaluation with and function2 ( ) code in Foo2. For the same reason as above, the deriver determines that Foo2 does not utilize function2 ( ), and therefore, the propagated property evaluation for Foo2 has no impact upon the property evaluation of Foo2.

It will be appreciated that in some embodiments, multiple the property evaluation summaries are compared as indicated in FIG. 10A and that these properties evaluation summaries each may relate to multiple properties. However, for the purpose of simplifying the explanation, only a property evaluation comparison with respect to the null pointer value for the changed Bar component is addressed here.

A comparison of FIGS. 9B-9C is used to illustrate a change in code of a depended upon component that impacts a property of the component but does not impact a corresponding property of a dependent component. Referring now to FIGS. 9B-9C, as between the first revision 804 shown in FIG. 9B and the second revision 806 shown in FIG. 9C, the code 812 that specifies instantiation of the class member Bla (and thus determines the type of the return value) in function2 ( ) is moved into the body of the if-condition 810 as it appears in the second revision 806.

Figure 11A:
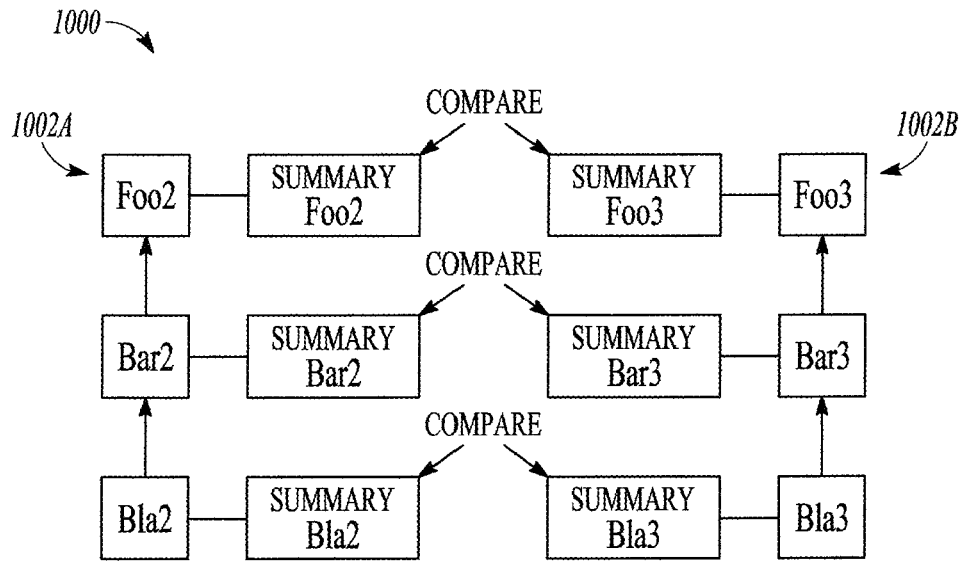
FIGS. 11A-11B are illustrative drawings showing respective dependency graph data structures (FIG. 11A) and property evaluation summary structures (FIG. 11B) that correspond to a comparison of the code of the first revision and the second revision of FIGS. 9B-9C in accordance with some embodiments.

FIG. 11A shows a dependency graph data structure 1002A produced in accordance with the process 200 of FIG. 3 to represent the first version 804. FIG. 11A also shows a dependency graph data structure 1002B produced in accordance with the process 200 of FIG. 3 to represent the second revision 806. In accordance with the process 400 of FIG. 5, property evaluation summary Bla3 is produced that corresponds to component Bla3; property evaluation summary Bar3 is produced that corresponds to component Bar3; and property evaluation summary Foo3 is produced that corresponds to component Foo3. Property evaluation summary Bla2, property summary Bar2 and property evaluation summary Foo2 were produced previously as described above.

When the property deriver of Table A that determines whether a function can return a null pointer is directed to function2 ( ) in a second revision 806, it determines that the function2 ( ) in component Bar3 now has the property "return may be null". The reason for the "return may be null" output is that function2 ( ) in the second revision 806 has two code paths: one code path initializes the return value and the other does not. Thus, because the property evaluation relating to return of the null pointer has changed, the property evaluation summary Bar3 for the second revision 806 of function2 ( ) is different from and does not match the property evaluation summary produced for the first version 804. In accordance with the processes of FIGS. 5-6A, the property evaluation determined for function2 ( ) for component Bar3 is propagated to component Foo3, and the deriver associates that property evaluation with function2 ( ) code in Foo3. Thus, in this example, function2 ( ) within Foo3 now also has the property "return may be null", since component Foo3 calls function2 ( ). However, since component Foo3 contains no code that actually utilizes function2 ( ), the property deriver of Table A that determines whether a function can return a null pointer determines that the null pointer property evaluation for Foo3 is unchanged despite the propagation of a changed property evaluation for function2 ( ) for component Foo3. In other words, the property evaluation summary Foo2 is determined to match the property evaluation summary Foo3 despite the propagation of a changed property evaluation for function2 ( ) to Foo3.

Referring to FIG. 6B2, it will be understood that although in this case decision module 622 determined that the "return may be null" property evaluation is propagated to Foo3, decision module 624 determines that such property evaluation is not propagated to the corresponding property evaluation of component Foo3, since Foo3 contains no code that actually utilizes function2 ( ).

Figure 11B:
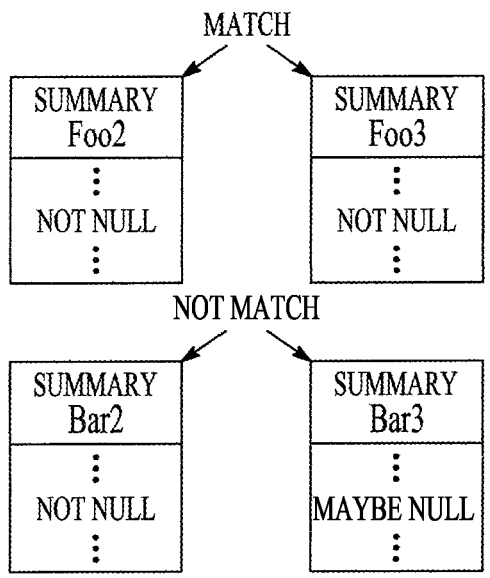

FIG. 11B shows certain details of property evaluation summary data structures produced in accordance with the processes 400, 500 of FIGS. 5-6A for the first version 804 and the second revision 806. In this example, again, the component evaluation information structure of Table A is used to produce the property information structure summaries. Focusing again only on function2 ( ), the function that changed as between the first revision 804 and the second revision, 806, it can be seen that the property evaluation summary Bar3 as to the null value is changed relative to the evaluation summary Bar2. However, as explained above, the change to the property evaluation summary Bar3 relative to function2 ( ) has no impact upon the property evaluation summary of Foo3, which still matches the property evaluation summary Foo2.

Thus, it will be appreciated that a property evaluation change as to a depended upon component does not necessarily result in a corresponding change to the same property evaluation in a dependent component. Again, it will be understood that in some embodiments each of the multiple the property evaluation summaries are compared as indicated in FIG. 11A and that these properties evaluation summaries each may relate to multiple property evaluations. However, for the purpose of simplifying the explanation, only a property evaluation summary comparison with respect to the null pointer value for the changed Bar component is addressed here.

A comparison of FIGS. 9C-9D is used to illustrate a change in code that does not itself execute that can impact property evaluation of a component. Referring to FIGS. 9C-9D, as between the second revision 806 and third revision 808 of the source code, the type of the class member Bla is changed from "int" 814 in the second revision 806 to "long" 816 in the third revision 808. It will be appreciated that in some computer systems, different size memory allocations are required for int type values and for long type values. For example, in some systems, an int type value has 4 bytes and a long type value has 8 bytes. Thus, a change of class object bla from int type in the second revision 806 to long type in the third revision 808 results in a change in memory allocation size.

Figure 12A:
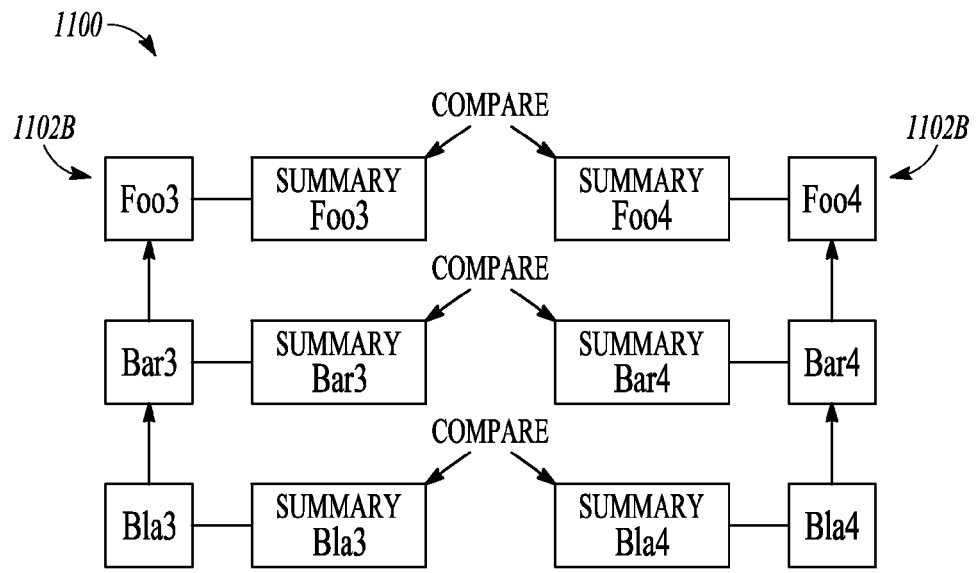
FIGS. 12A-12B are illustrative drawings showing respective dependency graph data structures (FIG. 12A) and property evaluation summary structures (FIG. 12B) that correspond to a comparison of the code of the second revision and the third revision of FIGS. 9C-9D in accordance with some embodiments.
Figure 12B:
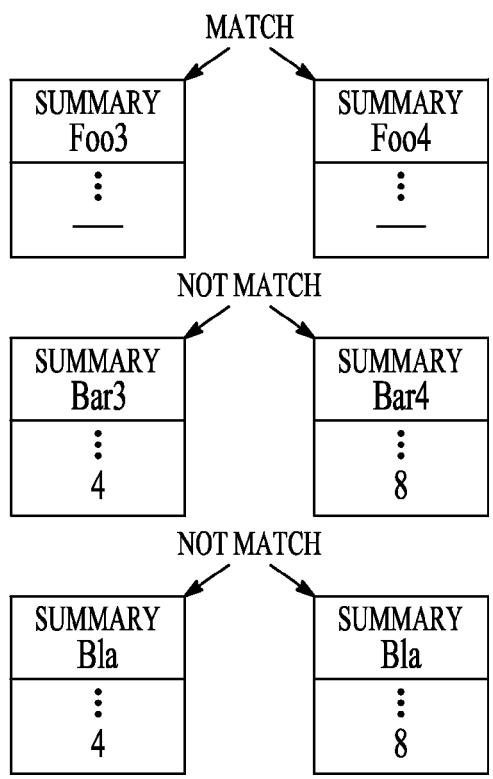

Focusing only on the property deriver of Table A that determines the size of an object in bytes and on the component Bla, the determined property evaluation is size=4 bytes for Bla3 in the second revision 806 is 4 bytes, and the determined property evaluation is size=8 bytes for Bla4 in the third revision 808. Accordingly, the processes, 400, 500 arrive a Foo3 property evaluation summary that is different from the Foo4 property summary as to instantiated class size as indicated in FIG. 12B. A comparison of the Foo3 and Foo4 property evaluation summaries, therefore, indicates that they do not match.

Moreover, it will be appreciated that in this example, component Bar instantiates object Bla, and therefore the change in instantiated class size as between Bla3 and Bla4 results in a change in instantiated class size as between Bar3 and Bar4 as indicated in FIG. 12B1. The property evaluations for Bla3 and Bla4 are propagated to Bar3 and Bar4, respectively. In this case, the property deriver of Table A that determines the size of an object in bytes determines different sizes for Bar3 and Bar4, and therefore, different property evaluations for Bar3 and Bar4. Thus, a change in the instantiated class size property of the depended upon component Bla as between the second and third revisions 806, 808 has an impact upon the instantiated class size property of the Bar dependent component as between the second and third revisions 806, 808, as indicated by changed property summaries as between Bar3 and Bar4.

However, in this example, the instantiated class size property of the dependent component Foo as between the second and third revisions 806, 808 is not impacted by the change in the instantiated class size properties of the Bla and Bar components. In particular, the function2 ( ) has a pointer to component Bar and does not actually instantiate component Bar, and therefore, does not actually instantiate Bla. Therefore, Foo is not classified as a "class definition" and the object size property deriver is not invoked for component Foo. Thus, the property summaries Foo3 and Foo4 match, indicating no property evaluation impact resulting from the change in Bla. For the purpose of simplifying the explanation, only a property evaluation summary comparison with respect to the changed the Bla and Bar components is addressed here.

Code Example 2

FIG. 13A shows an illustrative original version 1202 of second example code stored in a non-transitory computer readable storage device.

FIG. 13B shows an illustrative revision 1204 of second example code stored in a non-transitory computer readable storage device.

A comparison of FIGS. 13A-13B is used to illustrate a change in code of a depended upon component that impacts a property evaluation of the depended upon component that does have an impact on a corresponding evaluation property of a dependent component that is dependent upon the changed depended upon component. Note that that the code in FIGS. 13A-13B is the same as the code in FIGS. 9B-9C except that in FIGS. 13A-13B in component Foo, void is replaced by Bla* and 'return' is added to 'return bar→function2 ( )'. The addition of 'return' indicates that the bar->function2 ( )returns a value. The addition of Bla* is required in C++to declare the object that is returned, in this case Bla*. Thus, it will be appreciated that function1 ( )in component Foo is dependent upon function2 ( )in Bar. Details of the code in FIGS. 13A-13B that are the same as that of FIGS. 9B-9C will not be explained again.

Figure 14A:
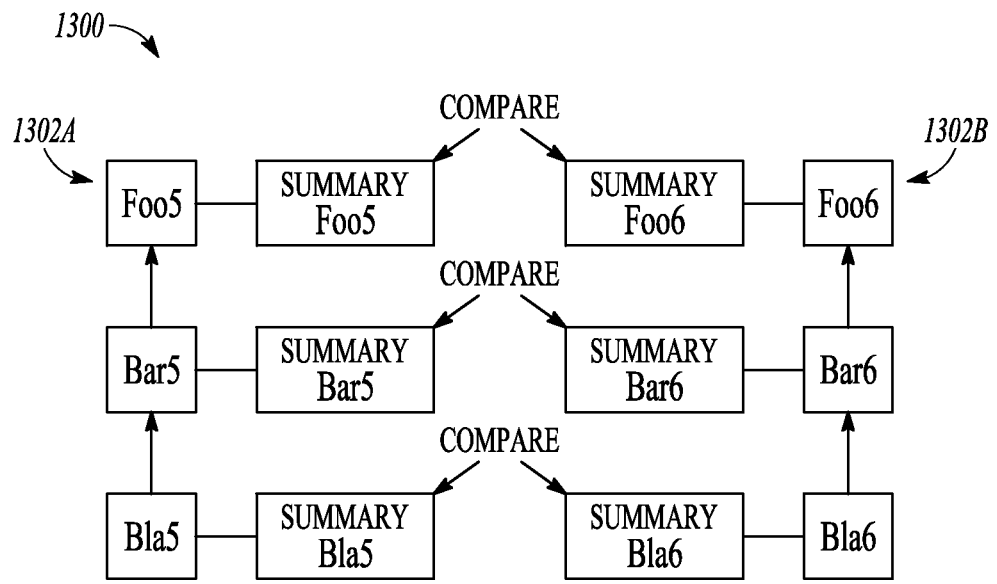
FIGS. 14A-14B are illustrative drawings showing respective dependency graph data structures (FIG. 14A) and property evaluation summary structures (FIG. 14B) that correspond to a comparison of the base code and revision code of FIGS. 13A-13B in accordance with some embodiments.
Figure 14B:
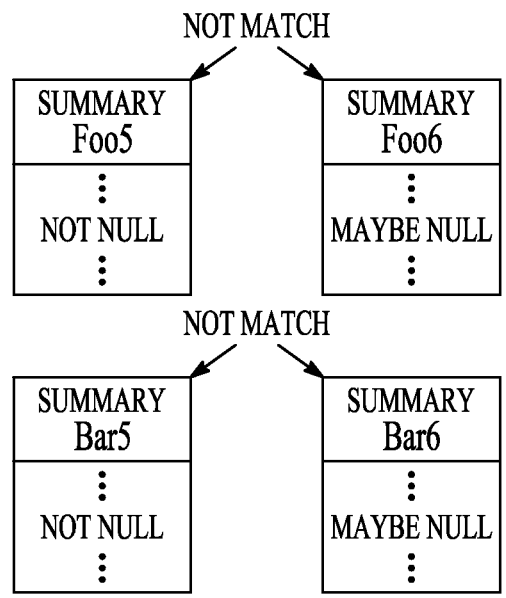

FIG. 14A shows a dependency graph data structure 1302A produced in accordance with the process 200 of FIG. 3 to represent the original version 1202 shown in FIG. 13A. FIG. 14A also shows a dependency graph data structure 1302B produced in accordance with the process 200 of FIG. 3 to represent the revision 1204 shown in FIG. 13B. FIG. 14B shows that, in accordance with the processes 400, 500 of FIGS. 5-6A, property evaluation summary Bla5 is produced that corresponds to component Bla5; property evaluation summary Bar5 is produced that corresponds to component Bar5; and property evaluation summary Foo5 is produced that corresponds to component Foo5. In addition, property evaluation summary Bla6 is produced that corresponds to component Bla6; property evaluation summary Bar6 is produced that corresponds to component Bar6; and property evaluation summary Foo6 is produced that corresponds to component Foo6.

As will be appreciated from the above explanation with reference to FIGS. 9B-9C, the addition of the code 812 results in the property deriver of Table A that determines whether a function can return a null pointer determines property evaluations for Bar5 and Bar6 of FIGS. 13A-13B that do not match. Bar5 has the property not null, and Bar6 has the property evaluation "may be null", which means that the change as between components Bar5 and Bar6 has an impact upon a property of the component Bar. As explained above, the respective property evaluation determined for function2 ( ) for Bar5 is propagated to Foo5 and is associated with the code in Foo5 that corresponds to function2 ( ). Similarly, the respective property evaluation determined for function2 ( ) for Bar6 is propagated to Foo6 and is associated with the code in Foo5 that corresponds to function2 ( ). Now, with the "return" code associated with function2 ( ) in component Foo in FIGS. 13A-13B, the value returned to Foo by function2 ( ) in Bar actually is utilized by Foo. As a result, the property deriver of Table A that determines whether a function can return a null pointer this time does consider the respective property evaluations for function2 ( ) that are propagated for Bar5 and Bar6.

In other words, with the addition of the "return" code in Foo5 and Foo6, the respective propagated property evaluations from Bar5 and Bar6 that the deriver associates with the function2 ( ) code in Foo5 and Foo6, impacts the property evaluation outcomes for respective components Foo5 and Foo6. As a result, in this example, the property deriver determines that Foo5 has the property evaluation "not null" since the function2 ( ) in Foo5 has the property "not null" and determines that Foo6 has the property evaluation "may be null" since the function2 ( ) in Foo6 has the property "may be null". Thus, the property evaluation summary Foo5 does not match the property evaluation summary Foo6, which indicates that change as between the components Bar5 and Bar6 has an impact upon a property evaluation of Foo. For the purpose of simplifying the explanation, only a property evaluation summary comparisons with respect to the changed the Bla and Foo components are addressed here.

Referring to FIG. 6B2, it will be understood that in this case decision module 622 determined that the "not null" property evaluation is propagated to component Foo5 and that the "may be null" property evaluation is propagated to component Foo6, and that decision module 624 determines that such property evaluations are propagated to the corresponding property evaluations for components Foo5 and Foo6, since the addition of the "return" statement results in Foo5 and Foo6 containing code that actually utilizes function2 ( ).

Referring to FIGS. 5-6A and FIGS. 13A-13B, it will be appreciated that in the course of determining property evaluations for dependent component Foo, the code of component Foo is parsed to ascertains that the Foo code structure indicates a dependency of function1 ( ) in component Foo upon function2 ( ) in component Bar.

Moreover, in the course of determining a property evaluation for component Foo, a property evaluation associated with function2 ( ) generated for component Bar is received as input for such determination. The change in Bar, with the addition of the code 812 as between the original version 1202 and the revision 1204, has an impact upon the property evaluation of Foo in the revision 1204. In particular, different values for function2 ( ) are returned through Bar in the original version 1202 and the revision 1204. Thus the example of FIGS. 13A-13B illustrates a change in code of a depended upon component Bar that has an impact upon code of the dependent component Foo. The processes of FIGS. 5-6A recognize that change impact and encode indicia of the change impact into the respective summaries Foo5, Foo6 illustrated in FIG. 14B.

Hardware Environment

Figure 15:
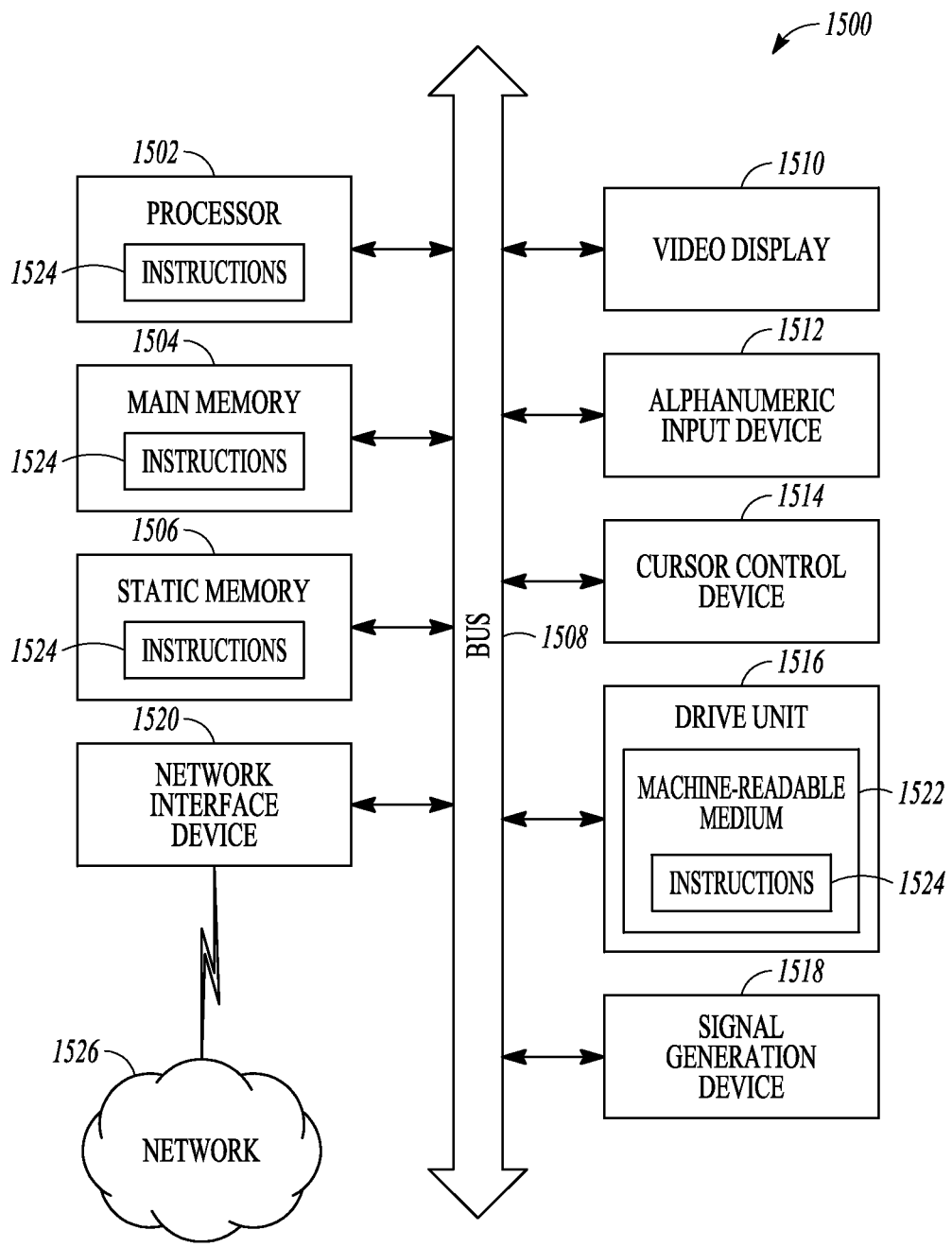
FIG. 15 shows a diagrammatic representation of a machine in the example form of a computer system within which a set of instructions, for causing the machine to perform any one or more of the methodologies discussed herein, may be executed in accordance with some embodiments.

FIG. 15 shows an illustrative diagrammatic representation of a more particularized computer system 1500 in the example form, to implement the generalized computer system of FIG. 15. The computer system 1500 can comprise, for example, can be configured to implement a static analysis tool including property deriver checkers, for example. In alternative embodiments, the computer system operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504 and a static memory 1506, which communicate with each other via a bus 1508. The computer system 1500 may further include a video display unit 1510 (e.g., liquid crystal display (LCD), organic light emitting diode (OLED) display, touch screen, or a cathode ray tube (CRT)) that can be used to display the results of the change impact analysis, for example. The computer system 1500 also includes an alphanumeric input device 1512 (e.g., a keyboard, a physical keyboard, a virtual keyboard using software), a cursor control device or input sensor 1514 (e.g., a mouse, a track pad, a trackball, a sensor or reader, a machine readable information reader, bar code reader), a disk drive unit 1516, a signal generation device 1518 (e.g., a speaker) and a network interface device or transceiver 1520.

The disk drive unit 1516 includes a non-transitory machine-readable storage device medium 1522 on which is stored one or more sets of instructions (e.g., software 1524) embodying any one or more of the methodologies or functions described herein, such as the processes of FIGS. 3, 5 and 6A-6C. The software 1524 may also reside, completely or at least partially, within the main memory 1504 and/or within the processor 1502 during execution thereof by the computer system 1500, the main memory 1504 and the processor 1402 also constituting non-transitory machine-readable storage device media. The non-transitory machine-readable storage device medium 1522 also can store an integrated circuit design and waveform structures.

The 1524 may further be transmitted or received over a network 1426 via the network interface device 1520.

While the machine-readable medium 1522 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the detailed description, with each claim standing on its own as a separate embodiment.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to evaluate impact of a change in code of a depended upon component of a system stored in a computer readable storage device, upon a dependent component of the system, comprising:

providing in a computer readable storage device a first property evaluation summary structure that associates multiple respective property evaluations with a first version of a first component of the system;
providing in a computer readable storage device a second property evaluation summary structure that associates multiple respective property evaluations with a second version of the first component of the system;
providing in a computer readable storage device a third property evaluation summary structure that associates multiple respective property evaluations with a first version of a second component of the system;
providing in a computer readable storage device a fourth property evaluation summary structure that associates multiple respective property evaluations with a second version of the second component of the system;
comparing, by a processor, respective property evaluations within the first property evaluation summary structure with corresponding property evaluations within the second property evaluation summary structure; and
comparing, by a processor, respective property evaluations within the third property evaluation summary structure with corresponding property evaluations within the fourth property evaluation summary structure;
wherein the first component of the system is dependent upon the second component of the system, and wherein the computer readable storage device does not consist of transitory, propagating signals.

2. The method of claim 1,
wherein each of the first, second, third and fourth property evaluation summary structures contains the same kinds of property evaluations.

3. The method of claim 1,
wherein the respective property evaluations within the respective first and second property evaluation summary structures are associated with the same respective function.

4. The method of claim 1,
wherein the respective property evaluations within the respective first and second property evaluation summary structures are associated with the same respective first function; and
wherein the respective property evaluations within the respective third and fourth property evaluation summary structures are associated with the same respective second function.

5. The method of claim 4,
wherein the first and second functions are different functions.

6. The method of claim 1,
wherein the respective property evaluations within the respective first and second property evaluation summary structures are associated with the same respective function; and
wherein at least one respective property evaluation within each of the respective first and second property evaluation summary structures indicates whether the respective function returns a null pointer.

7. The method of claim 1,
wherein the respective property evaluations within the respective first and second property evaluation summary structures are associated with the same respective first function;
wherein at least one respective property evaluation within each of the respective first and second property evaluation summary structures indicates whether the respective first function returns a null pointer;
wherein the respective property evaluations within the respective third and fourth property evaluation summary structures are associated with the same respective second function; and
wherein at least one respective property evaluation within each of the respective third and fourth property evaluation summary structures indicates whether the respective second function returns a null pointer.

8. The method of claim 1,
wherein the respective property evaluations within the respective first and second property evaluation summary structures are associated with the same respective function; and
wherein at least one respective property evaluation within each of the respective first and second property evaluation summary structures indicates whether the respective function dereference its argument.

9. The method of claim 1,
wherein the respective property evaluations within the respective first and second property evaluation summary structures are associated with the same respective first function;
wherein at least one respective property evaluation within each of the respective first and second property evaluation summary structures indicates whether the respective first function dereference its argument;
wherein the respective property evaluations within the respective third and fourth property evaluation summary structures are associated with the same respective second function; and
wherein at least one respective property evaluation within each of the respective third and fourth property evaluation summary structures indicates whether the respective second function dereference its argument.

10. The method of claim 1,
wherein the respective property evaluations within the respective first and second property evaluation summary structures are associated with the same respective function; and
wherein at least one respective property evaluation within each of the respective first and second property evaluation summary structures indicates whether the respective function is a result of memory allocation operation.

11. The method of claim 1,
wherein the respective property evaluations within the respective first and second property evaluation summary structures are associated with the same respective first function;
wherein at least one respective property evaluation within each of the respective first and second property evaluation summary structures indicates whether the respective first function dereference its argument;
wherein the respective property evaluations within the respective third and fourth property evaluation summary structures are associated with the same respective second function; and
wherein at least one respective property evaluation within each of the respective third and fourth property evaluation summary structures indicates whether the respective second function dereference its argument.

12. The method of claim 1,
wherein the respective property evaluations within the respective first and second property evaluation summary structures are associated with the same respective class definition.

13. The method of claim 1,
wherein the respective property evaluations within the respective first and second property evaluation summary structures are associated with the same respective class definition;
wherein at least one respective property evaluation within each of the respective first and second property evaluation summary structures indicates a size of an instantiated class in bytes.

14. A method to evaluate impact of a change in code of a depended upon component of a system stored in a computer readable storage device, upon a dependent component of the system, comprising:
identifying a dependency relationship between a first component stored in a computer readable storage device and a second component stored in the computer readable storage device;
in response to a determination that the second component depends upon the first component, configuring a computer system to obtain a first property evaluation corresponding to the first component; and
in response to the act of obtaining the first property evaluation corresponding to the first component, configuring the computer system to;
associate the first property evaluation with the second component, and
obtain a second property evaluation corresponding to the second component, wherein the second component is associated with the first property evaluation, wherein obtaining the second property evaluation corresponding to the second component associated with the first property evaluation includes taking into account the first property evaluation in the course of obtaining the second property evaluation, and wherein the computer readable storage device does not consist of transitory, propagating signals.

15. The method of claim 14,
wherein associating the first property evaluation with the second component includes associating the first property evaluation with one or more lines of code of the second component.

16. The method of claim 14,
wherein taking into account includes determining whether or not to propagate the first property evaluation to the second property evaluation.

17. The method of claim 14,
wherein associating the first property evaluation with the second component includes associating the first property evaluation with one or more lines of code of the second component; and
wherein obtaining the second property evaluation corresponding to the second component associated with the first property evaluation includes taking into account the first property evaluation associated with the one or more lines of code of the second component in the course of obtaining the second property evaluation.

18. The method of claim 14,
wherein taking into account includes examining one or more lines of code of the second component and determining whether or not to propagate the first property evaluation to the second property evaluation based at least in part upon the examination.

19. The method of claim 14 further including:
identifying a dependency relationship between the second component stored in the computer readable storage device and a third component stored in the computer readable storage device; and in response to a determination that the third component depends upon the second component, configuring the computer system to:
associate the second property evaluation with the third component, and
obtain a third property evaluation corresponding to the third component, wherein the third component is associated with the second property evaluation.

20. The method of claim 19,
wherein identifying the dependency relationship between the first component and the second component includes parsing code of the first component to identify the dependency relationship; and
wherein identifying the dependency relationship between the second component and the third component includes parsing code of the second component to identify the dependency relationship.

21. The method of claim 19 further including:
producing a dependency graph in the computer readable storage device that indicates dependency relationships between the first, second and third components;
wherein identifying the dependency relationship between the first component and the second component includes referring to the dependency graph to determine the dependency relationship; and
wherein identifying the dependency relationship between the second component and the third component includes referring to the dependency graph to determine the dependency relationship.

22. The method of claim 14,
wherein identifying the dependency relationship between the first component and the second component includes parsing code of the first component to identify the dependency relationship.

23. The method of claim 14 further including:
producing a dependency graph in the computer readable storage device that indicates dependency relationships between the first component and the second component;
wherein identifying the dependency relationship between the first component and the second component includes referring to the dependency graph to determine the dependency relationship.

24. An article of manufacture that includes a computer readable storage device that stores code to configure a computer to implement a method to evaluate impact of a change in code of a depended upon component of a system stored in a computer readable storage device, upon a dependent component of the system, comprising:
identifying a dependency relationship between a first component stored in a computer readable storage device and a second component stored in the computer readable storage device;
in response to a determination that the second component depends upon the first component, configuring a computer system to obtain a first property evaluation corresponding to the first component; and
in response to the act of obtaining the first property evaluation corresponding to the first component, configuring the computer system to:
associate the first property evaluation with the second component, and
obtain a second property evaluation corresponding to the second component, wherein the second component is associated with the first property evaluation, wherein obtaining the second property evaluation corresponding to the second component associated with the first property evaluation includes taking into account the first property evaluation in the course of obtaining the second property evaluation, and wherein the computer readable storage device does not consist of transitory, propagating signals.

25. A system including a computer system operatively coupled to a computer readable storage device, comprising:
means for identifying a dependency relationship between a first component stored in a computer readable storage device and a second component stored in the computer readable storage device;
means for, in response to a determination that the second component depends upon the first component, obtaining a first property evaluation corresponding to the first component;
means for, in response to the act of obtaining the first property evaluation corresponding to the first component, associating the first property evaluation with the second component; and means for, in response to the act of obtaining the first property evaluation corresponding to the first component, obtaining a second property evaluation corresponding to the second component, wherein the second component is associated with the first property evaluation, wherein obtaining the second property evaluation corresponding to the second component associated with the first property evaluation includes taking into account the first property evaluation in the course of obtaining the second property evaluation, and wherein the computer readable storage device does not consist of transitory, propagating signals.

26. A method to evaluate impact of a change in code of a depended upon component of a system stored in a computer readable storage device, upon a dependent component of the system, comprising:
configuring a computer system to obtain, successively in a component dependency order, respective property evaluations for each of multiple components and
configuring the computer system to associate respective successive obtained property evaluations in a computer readable storage device with respective code that is part of a respective next successive component in the component dependency order that depends upon the respective component for which the respective associated property evaluation is obtained;
wherein at least one of the respective successive acts of obtaining property evaluations includes obtaining a respective property evaluation for a respective component having respective code that is associated with a property evaluation obtained for a respective previous successive component in the component dependency order, and taking into account the property evaluation obtained for the respective previous successive component in the component dependency order in the course of obtaining the respective property evaluation for the respective component having respective code, and wherein the computer readable storage device does not consist of transitory, propagating signals.

27. The method of claim 26,
wherein the act of obtaining, successively in the component dependency order, includes starting with a base component.

28. The method of claim 27 further including:
identifying a component of the system that the base component depended upon.

29. The method of claim 28,
wherein identifying the component of the system that the base component depended upon includes parsing respective code of successive components of the system in reverse component dependency order to identify dependency relationships between them.

30. The method of claim 28 further including:
producing a dependency graph in the computer readable storage device that indicates dependency relationships between a first, second and third components;
wherein identifying the component of the system that the base component depended upon includes referring to the dependency graph to identify the component of the system that the base component depended upon.

31. An article of manufacture that includes a computer readable storage device that stores code to configure a computer to implement a method to evaluate impact of a change in code of a depended upon component of a system stored in a computer readable storage device, upon a dependent component of the system, comprising:
configuring a computer system to obtain, successively in a component dependency order, respective property evaluations for each of multiple components and
configuring the computer system to associate respective successive obtained property evaluations in a computer readable storage device with respective code that is part of a respective next successive component in the component dependency order that depends upon the respective component for which the respective associated property evaluation is obtained;
wherein at least one of the respective successive acts of obtaining property evaluations includes obtaining a respective property evaluation for a respective component having respective code that is associated with a property evaluation obtained for a respective previous successive component in the component dependency order, and taking into account the property evaluation obtained for the respective previous successive component in the component dependency order in the course of obtaining the respective property evaluation for the respective component having respective code, and wherein the computer readable storage device does not consist of transitory, propagating signals.

32. A system including a computer system operatively coupled to a computer readable storage device, comprising:
means for obtaining, successively in a component dependency order, respective property evaluations for each of multiple components; and
means for associating respective successive obtained property evaluations in a computer readable storage device with respective code that is part of a respective next successive component in the component dependency order that depends upon the respective component for which the respective associated property evaluation is obtained;
wherein at least one of the respective successive acts of obtaining property evaluations includes obtaining a respective property evaluation for a respective component having respective code that is associated with a property evaluation obtained for a respective previous successive component in the component dependency order, and taking into account the property evaluation obtained for the respective previous successive component in the component dependency order in the course of obtaining the respective property evaluation for the respective component having respective code, and wherein the computer readable storage device does not consist of transitory, propagating signals.

* * * * *

UNITED STATES PATENT AND TRADEMARK OFFICE
CERTIFICATE OF CORRECTION

| | | |
|---|---|---|
| PATENT NO. | : 9,032,376 B2 | Page 1 of 1 |
| APPLICATION NO. | : 14/037576 | |
| DATED | : May 12, 2015 | |
| INVENTOR(S) | : Boshernitsan et al. | |

It is certified that error appears in the above-identified patent and that said Letters Patent is hereby corrected as shown below:

In the claims

In column 29, line 24, in Claim 14, delete "to;" and insert --to:--, therefor

In column 31, line 36, in Claim 26, after "components", insert --;--, therefor

In column 32, line 20, in Claim 31, after "components", insert --;--, therefor

Signed and Sealed this
Twenty-fourth Day of November, 2015

Michelle K. Lee
*Director of the United States Patent and Trademark Office*